US007609966B2

(12) United States Patent
Gumaste et al.

(10) Patent No.: US 7,609,966 B2
(45) Date of Patent: Oct. 27, 2009

(54) METHOD AND SYSTEM FOR TIME-SHARING TRANSMISSION FREQUENCIES IN AN OPTICAL NETWORK

(75) Inventors: Ashwin Anil Gumaste, Dallas, TX (US); Susumu Kinoshita, Plano, TX (US); Raghu Ramireddy Valisammagari, Murphy, TX (US)

(73) Assignee: Fujitsu Limited, Kawasaki (JP)

( * ) Notice: Subject to any disclaimer, the term of this patent is extended or adjusted under 35 U.S.C. 154(b) by 602 days.

(21) Appl. No.: 11/061,255

(22) Filed: Feb. 18, 2005

(65) Prior Publication Data

US 2006/0188258 A1 Aug. 24, 2006

(51) Int. Cl.
*H04B 10/20* (2006.01)
(52) U.S. Cl. ............................ 398/59; 398/72; 398/99; 398/36; 370/389; 370/468; 370/390; 370/392; 370/352
(58) Field of Classification Search .................. 398/59, 398/83, 79, 66, 67, 68, 69, 70, 71, 72, 75, 398/77, 98, 99, 100, 135, 36, 58; 370/85.2, 370/85.3, 85.6, 93, 94.1, 57, 16, 216, 390, 370/392, 468, 389, 352, 432, 465
See application file for complete search history.

(56) References Cited

U.S. PATENT DOCUMENTS

| | | | |
|---|---|---|---|
| 4,651,316 A | 3/1987 | Kocan et al. | 370/462 |
| 5,258,978 A | 11/1993 | Cloonan et al. | 370/411 |
| 5,469,428 A | 11/1995 | Tokura et al. | |
| 5,724,166 A * | 3/1998 | Nakata | 398/61 |
| 5,854,700 A * | 12/1998 | Ota | 398/60 |
| 5,903,371 A | 5/1999 | Arecco et al. | |
| 6,160,648 A | 12/2000 | Oberg et al. | |
| 6,169,746 B1 | 1/2001 | Ueda et al. | 370/466 |
| 6,195,186 B1 | 2/2001 | Asahi | |
| 6,504,849 B1 | 1/2003 | Wang et al. | 370/455 |
| 6,567,194 B1 | 5/2003 | Badr | 398/1 |
| 6,594,232 B1 | 7/2003 | Dupont | |
| 6,631,134 B1 | 10/2003 | Zadikian et al. | |

(Continued)

OTHER PUBLICATIONS

Banaerjee et al., "Generalized Multiprotocol Label Switching: An Overview of Routing and Management Enhancements," IEEE Communications Magazine, Jan. 2001, pp. 144-149.

(Continued)

*Primary Examiner*—Hanh Phan
(74) *Attorney, Agent, or Firm*—Baker Botts L.L.P.

(57) ABSTRACT

An optical communication system includes an optical ring that couples a hub node and a plurality of local nodes. The hub node is capable of receiving traffic over the optical ring from the plurality of local nodes on a transmitting wavelength and transmitting traffic over the optical ring to the local nodes on a receiving wavelength. At least one local node is capable of adding traffic to the optical ring by determining whether any other local node is transmitting at the transmitting wavelength and, in response to determining that no other local node is transmitting at the transmitting wavelength, transmitting a request message to the hub node requesting use of the transmitting wavelength. The local node adding traffic is further capable of receiving a grant message from the hub node and, in response to receiving the grant message from the hub node, transmitting traffic at the transmitting wavelength.

32 Claims, 9 Drawing Sheets

U.S. PATENT DOCUMENTS

| | | | |
|---|---|---|---|
| 6,701,085 B1 | 3/2004 | Muller | |
| 6,728,484 B1 | 4/2004 | Ghani | 398/42 |
| 6,766,113 B1 | 7/2004 | Al-Salameh et al. | |
| 6,775,477 B2 | 8/2004 | Badr | 398/1 |
| 6,795,394 B1 | 9/2004 | Swinkels et al. | |
| 6,850,711 B2 | 2/2005 | Tsuruta | 398/168 |
| 6,882,799 B1 | 4/2005 | Beshai et al. | |
| 6,889,007 B1 | 5/2005 | Wang et al. | 398/79 |
| 7,016,363 B1 | 3/2006 | Reed et al. | |
| 7,023,796 B2 | 4/2006 | De Girolamo et al. | |
| 7,031,299 B2 | 4/2006 | Chaudhuri et al. | |
| 7,088,920 B2 | 8/2006 | Krishnaswamy et al. | |
| 7,184,663 B2 | 2/2007 | Kinoshita et al. | |
| 7,218,854 B1 * | 5/2007 | Unitt et al. | 398/63 |
| 7,266,296 B2 | 9/2007 | Ovadia et al. | |
| 7,308,198 B1 | 12/2007 | Chudak et al. | |
| 7,386,233 B2 * | 6/2008 | Dotaro et al. | 398/59 |
| 2002/0114030 A1 | 8/2002 | Dwivedi et al. | |
| 2003/0189920 A1 | 10/2003 | Erami et al. | |
| 2003/0223104 A1 | 12/2003 | Kinoshita et al. | |
| 2003/0223682 A1 | 12/2003 | Kinoshita et al. | |
| 2003/0235153 A1 | 12/2003 | Lee et al. | |
| 2004/0034753 A1 | 2/2004 | Jeddeloh | |
| 2004/0052530 A1 | 3/2004 | Tian et al. | |
| 2004/0234263 A1 | 11/2004 | Ovadia et al. | |
| 2004/0252995 A1 | 12/2004 | Ovadia et al. | |
| 2005/0013613 A1 | 1/2005 | Stevenson et al. | |
| 2005/0088964 A1 * | 4/2005 | Yang et al. | 370/216 |
| 2005/0191054 A1 | 9/2005 | Aoki et al. | |
| 2006/0013584 A1 | 1/2006 | Miyazaki | |
| 2006/0056279 A1 * | 3/2006 | Pronk et al. | 370/205 |
| 2006/0188258 A1 | 8/2006 | Gumaste et al. | |
| 2006/0210268 A1 | 9/2006 | Gumaste et al. | |
| 2006/0210273 A1 | 9/2006 | Gumaste et al. | |
| 2006/0222360 A1 | 10/2006 | Gumaste et al. | |
| 2006/0228112 A1 | 10/2006 | Palacharla et al. | |
| 2006/0245755 A1 | 11/2006 | Gumaste et al. | |
| 2007/0019662 A1 | 1/2007 | Gumaste et al. | |
| 2007/0047958 A1 | 3/2007 | Gumaste et al. | |
| 2007/0121507 A1 | 5/2007 | Manzalini et al. | |
| 2007/0255640 A1 | 11/2007 | Gumaste et al. | |

OTHER PUBLICATIONS

Bertsekas, Dimitri, "The Auction Algorithm: A Distributed Relaxation Method for the Assignment Problem," Report LIDS-P-1653, Mar. 1987, Revised Sep. 1987, pp. 1-27.

Chlamtac et al., "Bandwidth Management in Community Networks," Center for Advance Telecommunications Systems and Services, pp. 1-11, 2002, IWDC, LNCS 2571.

Chlamtac et al., Lightpath Communications: An Approach to High Bandwidth Optical WAN's, IEEE Transactions on Communications, vol. 40, No. 7, Jul. 1992, pp. 1171-1182.

Chlamtac et al., "Light-Trails: A Solution to IP Centric Communication in the Optical Domain," 11 pages, Center for Advance Technology Systems and Services, University of Texas at Dallas, Texas 75083, USA, Quality of Service in Multiservice IP Networks, Second International Workshop, QoS-IP 2003, Feb. 2003.

Dolzer et al., "Evaluation of Reservation Mechanisms for Optical Burst Switching," 8 pages, 2001, AEU Int. J. Electron. Commun. 55 No. 1, 1-1.

Fang et al., "Optimal Light Trail Design in WDM Optical Networks," IEEE Communications Society, 2004 IEEE, pp. 1699-1703.

Foster, "The Grid Blue Print for a New Computing Infrastructure," Morgan Kauffman, Nov. 1998, pp. 479-532.

Frederick et al., "Light Trails: A Sub-Wavelength Solution for Optical Networking," 2004 IEEE, 2004 Workshop on High Performance Switching and Routing, Apr. 19-21, 2004.

Fumagalli et al., "The Multi-Token Inter-Arrival Time (MTIT) Access Protocol for Supporting IP over WDM Ring Network," 1999 IEEE, pp. 586-590.

Ghani et al., "On IP-Over-WDM Integration," IEEE Communications Magazine, Mar. 2000, pp. 72-84, WDM Optical Networks: A Reality Check.

Gumaste et al., "A Scheduling Procedure for Control Signaling in Optical Burst Switched Network," in Proceedings for the First International Conference on Optical Communications and Networks, Nov. 11-14, 2002, pp. 190-193.

Gumaste et al., Bifurcated Traffic and Channel Assignment (BITCA) to Interconnected Metro Rings, 3 pages, OFC 2002.

Gumaste et al., "Light-Frames: A Pragmatic Framework for Optical Packet Transport," IEEE Communications Society, pp. 1537-1542, 2004.

Gumaste et al., "Light-Trail and Light-Frame Architectures for Optical Networks," PHD Thesis, University of Texas Dallas, Dec. 2003.

Gumaste et al., "Light-Trails: A Novel Conceptual Framework for Conducting Optical Communications," Center for Advanced Telecommunications Services and Studies, 7 pages, 2003.

Gumaste et al., Light Trails: An Optical Solution for IP Transport, J. Opt. Net., vol. 3, 2004, pp. 261-281, Center for Advanced Telecommunications Systems and Services, The University of Texas at Dallas, May 2004, vol. 3, No. 5, Journal of Optical Networking, pp. 261-281.

Gumaste et al., "Heuristic and Optimal Techniques for Light-Trail Assignment in Optical WDM Networks," Photonics Networking Laboratory, 7 pages.

Gumaste et al., Mesh Implementation of Light Trails: A Solution to IP Centric Communication, 6 pages, Center for Advanced Telecommunications Services and Studies.

Gumaste et al., "Next-Generation Optical Storage Area Networks: The Light-Trails Approach," Optical Storage Area Networks, IEEE Communications Magazine, Mar. 2005, pp. 72-79.

Gumaste et al., "Optimizing Light-Trail Assignment to WDM Networks for Dynammic IP Centric Traffic," pp. 113-118.

Gumaste et al. Performance Evaluation and Demonstration of Light Trails in Shared Wavelength Optical Networks (SWONSs), 2 pages, date unknown.

Gumaste et al., "Providing Bandwidth on Demand to End-Users by Adaptations to a GMPLS Framework: The Light-Trails Approach," National Fiber Optics Engineers Conference, 2003 Technical Proceedings, pp. 1137-1141.

Gumaste et al., "Optical Implementation of Resilient Packet Rings Using Light-Trails," Advanced Computer Network and Architecture Laboratory, 7 pages.

Humblet, "Models of Blocking Probability in All-Optical Networks With and Without Wavelength Changers," IEEE Journal on Selected Areas in Communications, Jun. 1996, vol. 14, No. 5, ISACEM, 11 pages.

Kinoshita, S.. "Broadband Fiber Optic Amplifiers," OFC 2001, Optical Fiber Communications Conference and Exhibit, Mar. 17-22, 2001, 5 pages.

Ota et al., "High-Speed, Burst-Mode, Packet-Capable Optical Receiver and Instantaneous Clock Recovery for Optical Bus Operation," Journal of Lightwave Technology, vol. 12, No. 2, Feb. 1994, pp. 325-331.

Qiao et al., "On an IP-Centric Optical Control Plane" Intelligence in Optical Networks, IEEE Communication Magazine, Sep. 2001, pp. 88-93.

Ramaswami et al., "Routing and Wavelengths Assignment in All-Optical Networks," IEEE/ACM Transactions on Networking, Oct. 1995, vol. 5, No. 3, pp. 489-500.

Resilient Packet Ring Alliance, "An Introduction to Resilient Packet Ring Technology," A White Paper by the Resilient Packet Ring Alliance, Oct. 2001, pp. 1-16.

Sahasrabuddhe et al., "Fault Management in IP-Over-WDM Networks: WDM Protection versus IP Restoration," IEEE Journal on Selected Areas in Communications, vol. 20, No. 1, Jan. 2002, pp. 21-33.

Sasaki et al., "The Interface Between IP and WDM and Its Effect on the Cost of Survivability," IEEE Commununications Magazine, Jan. 2003, World Telecommunications Congress 2002 (WTC 2002), pp. 74-79.

Shrinkhande et al., "CSMA/CA MAC Protocols for IP Hornet: an IP Hornet: An IP Over WDM Metropolitan Area Ring Network," Stanford University Optical Communications Research Laboratory, 5 pages, 2000.

Spadaro et al., "Positioning of the RPR Standard in Contemporary Operator Environments," 10 pages.

Tancevski et al., "Optical Routing as Asynchronous, Variable Length Packets," IEEE Journal on Selected Areas in Communications, vol. 18, No. 10, Oct. 2000, pp. 2084-2093.

Verma et al., "Optical Burst Switching: A Viable Solution for Terabit IP Backbone," IEEE Network Magazine, vol. 14, No. 6, Nov./Dec. 2000, pp. 48-53.

Yoo et al., "Just Enough Time (JET): A High Speed Protocol for Bursty Traffic in Optical Networks,:" Proc. IEE/LEOS Tech. GII, Aug. 1997, pp. 26-27.

Yener et al., "Flow Trees: A Lower Bound Computation Tool for Network Optimization," Columbia Tool for Network Optimization, Columbia Univ. Tech. Rep. CUCS-006-94.

Zhang et al., "Differentiated Multi Layer Survivability in IP/WDM Networks," in Network Operations and Management Symposium, IEEE, New York, 2002, pp. 681-696.

Zhang et al., "A Heuristic Wavelength Assignment Algorithm for Multihop WDM Networks with Wavelength Routing and Wavelength Reuse," in Proc. INFOCOM 94, 1994, pp. 534-543.

Gumaste, "System and Method for Implementing Optical Light-Trails," U.S. Appl. No. 11/080,051, filed Mar. 15, 2005.

Gumaste, "System and Method for Implementing Optical Light-Trails," U.S. Appl. No. 11/080,752, filed Mar. 15, 2005.

Gumaste, "System and Method for Bandwidth Allocation in an Optical Light-Trail," U.S. Appl. No. 11/218,262, filed Aug. 13, 2005.

Gumaste, "System and Method for Transmission and Reception of Traffic in Optical Light-Trails," U.S. Appl. No. 11/095,246, filed Mar. 30, 2005.

Gumaste, "System and Method for Protecting Optical Light-Trails," U.S. Appl. No. 11/098,720, filed Apr. 4, 2005.

Gumaste, "System and Method for Shaping Traffic in Optical Light-Trails," U.S. Appl. No. 11/118,899, filed Apr. 29, 2005.

Gumaste, "Heuristical Assignment of Light-Trails in a Optical Netowrk," U.S. Appl. No. 11/185,958, filed Jul. 19, 2005.

Gumaste, "System and Method for Bandwidth Allocation in an Optical Light-Trail," U.S. Appl. No. 11/380,812, filed Apr. 28, 2006.

U.S. Appl. No. 11/080,051 entitled, "Method and System for Establishing Transmission Priority for Optical Light-Trails," filed Mar. 15, 2005, 40 pages.

Dutton et al., "Understanding Optical Communications," IBM International Technical Support Organization, Sep. 1998, p. 9, 366, and 367 (3 pages).

Ramaswami et al., "Optical Networks: A Practical Perspective," First Edition, Morgan Kauffman Publications, 1998, pp. 423-462 (41 total pages).

Maille et al., "Multi-Bid Auctions for Bandwidth Allocation in Communications Networks," INFOCOM 2004, Mar. 7-11, 2004, vol. 4, pp. 54-65 Mar. 7, 2004 through Mar. 11, 2004.

Chiang et al., "Balancing Supply and Demand of Bandwidth in Wireless Cellular: Networks: Utility Maximization Over Powers and Rates," INFOCOM 2004, Mar. 7-11, 2004, vol. 4, pp. 2800-2811 Mar. 7, 2004 through Mar. 11, 2004.

* cited by examiner

METHOD AND SYSTEM FOR TIME-SHARING TRANSMISSION FREQUENCIES IN AN OPTICAL NETWORK

TECHNICAL FIELD

The present invention relates generally to optical networks and, more particularly, to a method and system for time-sharing transmission frequencies in an optical network.

BACKGROUND

Telecommunication systems, cable television systems, and data communication networks use optical networks to rapidly convey large amounts of information between remote points. In an optical network, information is conveyed in the form of optical signals through optical fibers. Optical fibers comprise thin strands of glass capable of transmitting optical signals over long distances with very low loss of signal strength.

Recent years have seen an explosion in the use of telecommunication services. As the demand for telecommunication services continues to grow, optical networks are quickly becoming overburdened by the increasing amount of information communicated over such networks. The addition of new networks or the expansion of existing networks may however be too costly to be practical solutions to this problem. Thus, efficient use of network resources has become an important goal in developing and operating optical networks.

SUMMARY

According to a particular embodiment of the present invention, an optical communication system includes an optical ring, a hub node, and a plurality of local nodes. The hub node and the plurality of local nodes are coupled to the optical ring. The hub node is capable of receiving traffic over the optical ring from the plurality of local nodes on a transmitting wavelength and of transmitting traffic over the optical ring to the local nodes on a receiving wavelength.

The plurality of local nodes are capable of adding traffic to and drop traffic from the optical ring and at least one local node is capable of adding traffic to the optical ring by determining whether any other local node is transmitting at the transmitting wavelength. The local node adding traffic is also capable of transmitting a request message to the hub node requesting use of the transmitting wavelength, in response to determining that no other local node is transmitting at the transmitting wavelength. Additionally, the local node adding traffic is further capable of receiving a grant message from the hub node and, in response to receiving the grant message from the hub node, transmitting traffic at the transmitting wavelength.

Technical advantages of certain embodiments of the present invention include centralized data storage and processing in an optical network that utilizes wavelength-sharing to increase overall network capacity. Another technical advantage of one or more embodiments may include the ability to prioritize transmissions by particular network components on shared transmitting wavelengths.

It will be understood that the various embodiments of the present invention may include some, all, or none of the enumerated technical advantages. In addition other technical advantages of the present invention may be readily apparent to one skilled in the art from the figures, description, and claims included herein.

DETAILED DESCRIPTION OF THE DRAWINGS

Figure 1:
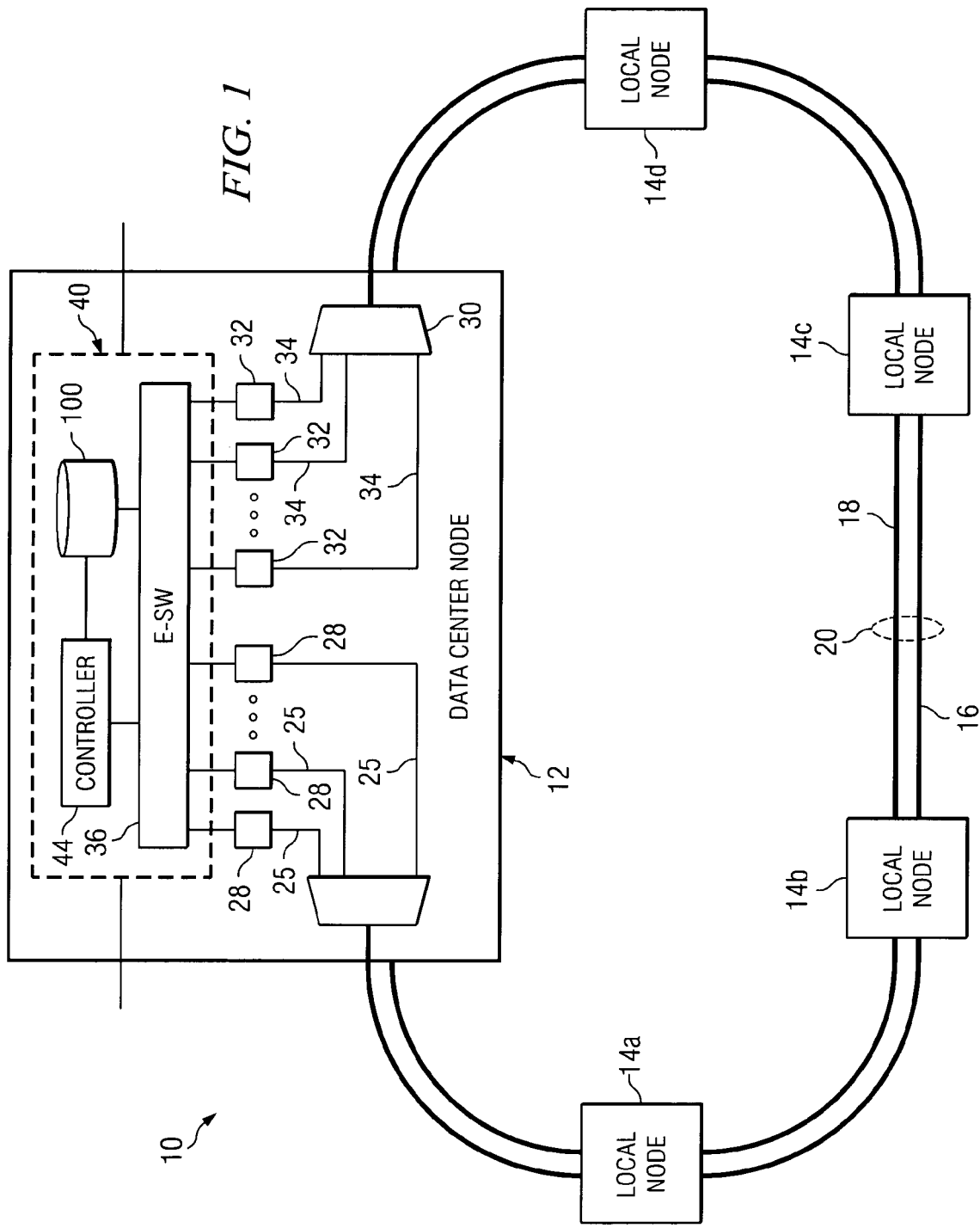
FIG. 1 is a block diagram illustrating an optical ring network in accordance with one embodiment of the present invention.

FIG. 1 illustrates an optical network 10 in accordance with one embodiment of the present invention. Optical network 10 includes a hub node 12 and a plurality of local nodes 14 coupled to an optical ring 20. During operation, local nodes 14 transmit traffic using one or more transmitting wavelengths and receive traffic propagating on optical ring 20 at one or more receiving wavelengths, while hub node 12 facilitates communication of information to local nodes 14. Moreover, in particular embodiments of network 10, hub node 12 manages the use of transmitting wavelengths utilized by local nodes 14 and facilitates sharing of one or more of the transmitting wavelengths. Although FIG. 1, illustrates one embodiment of network 10 that includes a particular number of local nodes 14 and hub nodes 12, network 10 may include any appropriate number of local nodes 14 and hub nodes 12 configured in any appropriate manner.

Although FIG. 1 illustrates a particular embodiment and configuration of network 10, other suitable types of optical networks may be used in accordance with the present invention. In the illustrated embodiment, network 10 is an optical network in which a number of optical channels are carried over a common path at different wavelengths. Network 10 may be a wavelength division multiplexed (WDM) network, a dense wavelength division multiplexed (DWDM) network, or any other suitable multi-channel network. Network 10 may be represent all or a portion of a short-haul metropolitan network, long-haul intercity network, or any other suitable network or combination of networks. Ring 20 may include, as appropriate, a single unidirectional fiber, a single bi-directional fiber, or a plurality of uni- or bi-directional fibers.

As shown, optical ring 20 comprises a pair of uni-directional fibers, first fiber 16 and second fiber 18, transporting traffic in counterclockwise and clockwise directions, respectively. Optical ring 20 optically connects the plurality of local nodes 14a-14d and hub node 12, and optical traffic propagates between nodes 12 and 14 over optical ring 20. As used herein, "traffic" means information transmitted, stored, or sorted in the network, including any request for services as discussed in more detail below. Such traffic may comprise optical signals having at least one characteristic modulated to encode audio, video, textual, real-time, non-real-time and/or other suitable data. Modulation may be based on phase shift keying (PSK), intensity modulation (IM), and other suitable methodologies. Additionally, the information carried by this traffic may be structured in any suitable manner. Although the description below focuses on an embodiment of network 10 that communicates traffic on optical ring 20 in the form of optical frames, network 10 may be configured to communicate traffic structured in the form of frames, as packets, or in any other appropriate manner.

Local nodes 14 are each operable to add and drop traffic to and from optical ring 20 to facilitate communication between a plurality of client devices (not shown) coupled to each local node 14 through a plurality of client ports. As used herein, the term "each" means every one of at least a subset of the identified items. More specifically, each local node 14 may receive traffic from the client devices coupled to that local node 14 and add this traffic to the optical ring 20 by inserting the added traffic into the traffic currently being transmitted by hub node 12 and local nodes 14 on optical ring 20. Concurrently, each local node 14 receives traffic from optical ring 20 and drops traffic destined for client devices of that local node 14. For the purposes of this description, local nodes 14 may "drop" traffic by transmitting a copy of the traffic to any appropriate components coupled to the relevant local node 14. As a result, local nodes 14 may drop traffic from optical ring 20 by transmitting the traffic to components coupled to the relevant local node 14 while allowing the traffic to continue to downstream components on optical ring 20.

The client devices may represent any devices appropriate for the communication or storage of information on optical network 10. Examples of client devices may include, but are not networked personal computers (PCs), telephones, fax machines, hard drives, and web servers. The contents and operation of local node 14, according to a particular embodiment, are discussed in greater detail below with respect to FIG. 2.

Hub node 12 receives optical traffic from local nodes 14 and other components of optical network 20 and transmits optical traffic to local nodes 14 at a receiving wavelength. In the illustrated embodiment, hub node 12 includes a demultiplexer 30, a plurality of receivers 32, a data center 40, a transmitter 28, and a multiplexer 22. The demultiplexer 30 demultiplexes WDM or other multichannel optical signals transmitted over the optical ring 20 into constituent channels and sends each optical signal 24 to an optical receiver 32. Each optical receiver 32 electrically recovers the encoded data from the corresponding traffic. The data is then forwarded to the data center 40. Although, for the sake of simplicity, only one demultiplexer 30, one multiplexer 22, one set of transmitters 28, and one set of receivers 32 are shown in FIG. 1, the illustrated embodiment of hub node 12 is assumed to have a demultiplexer 30, a multiplexer 22, and an appropriate number of transmitters 28 and receivers 32 for each of fibers 16 and 18.

Data center 40 receives traffic, sorts traffic based on one or more destination nodes associated with the traffic, and passes the sorted traffic to transmitter 28 for transmitting the traffic to local nodes 14 at one or more wavelengths on fiber 16 or 18 or, if appropriate, to external devices coupled to hub node 12 through external connections 26. As used herein, a "destination node" associated with particular traffic is the local node 14 to which the client device that is the intended destination of the traffic is coupled. In the illustrated embodiment, data center 40 includes an electrical switch 36, and a controller 44.

Switch 36 is coupled to controller 44 and services module 38. Although not illustrated, data center 40, in a particular embodiment, may include a Layer 3 (L3) switch or other suitable component for passing traffic to and from an Internet Protocol (IP) or other network coupled to optical network 10 via hub node 12. Switch 36 passes traffic received from the receivers 32, transmitters 28, and/or other components of hub node 12. Switch 36 may comprise a Layer 2 switch such as an Ethernet switch, IP switch, fiber channel (FC) switch, a router or other suitable devices for selectively directing traffic.

Controller 44 manages operation of electrical switch 36 and/or other components of hub node 12, and may comprise logic stored in memory. This logic may comprise computer disks, a hard disk memory or other suitable computer-readable media, and application specific integrated circuits (ASIC), field programmable gate arrays (FPGA), digital signal processors (DSP), or other suitable specific or general purpose processors, transmission media, or other suitable media in which logic may be encoded and utilized. In one embodiment, controller 44 comprises a server. Controller 44 is operable to send a command signal to the electrical switch 36 to facilitate the sorting of both inter- and intra-network traffic. In particular embodiments, hub node 12 may include a traffic buffer (not shown) for receiving and buffering traffic received from external networks and destined for local nodes 14 of optical network 10. In such embodiments, controller 44 may control operation and access to the traffic buffer for purposes of buffering, sorting, and transmitting traffic to appropriate local nodes 14.

Additionally, controller 44 may control operation of one or more components responsible for generating control signals to be transmitted to local nodes 14 on an optical supervisory channel (OSC). In a particular embodiment, this OSC represents one or more wavelengths, among a plurality of wavelengths utilized by optical network 10, that are dedicated to control signals. Alternatively, the OSC may represent a separate fiber in optical ring 20 on which hub node 12 transmits control signals.

In operation, local nodes 14 are operable to receive and drop traffic from optical ring 20. Once traffic is dropped from the optical ring 20, local nodes 14 may provide optical-to-electrical conversion of the dropped traffic for extracting data based on headers or tags associating portions of the traffic with a destination node and/or port. In a particular embodiment, each local node 14 is operable to drop traffic transmitted at one or more designated wavelengths, referred to here as "receiving wavelengths." Although the description below focuses on embodiments of optical network 10 in which local nodes 14 receive all optical traffic on a single receiving wavelength, particular embodiments of optical network 10 may be configured such that local nodes 14 receive optical traffic at a plurality of receiving wavelengths.

Figure 2:
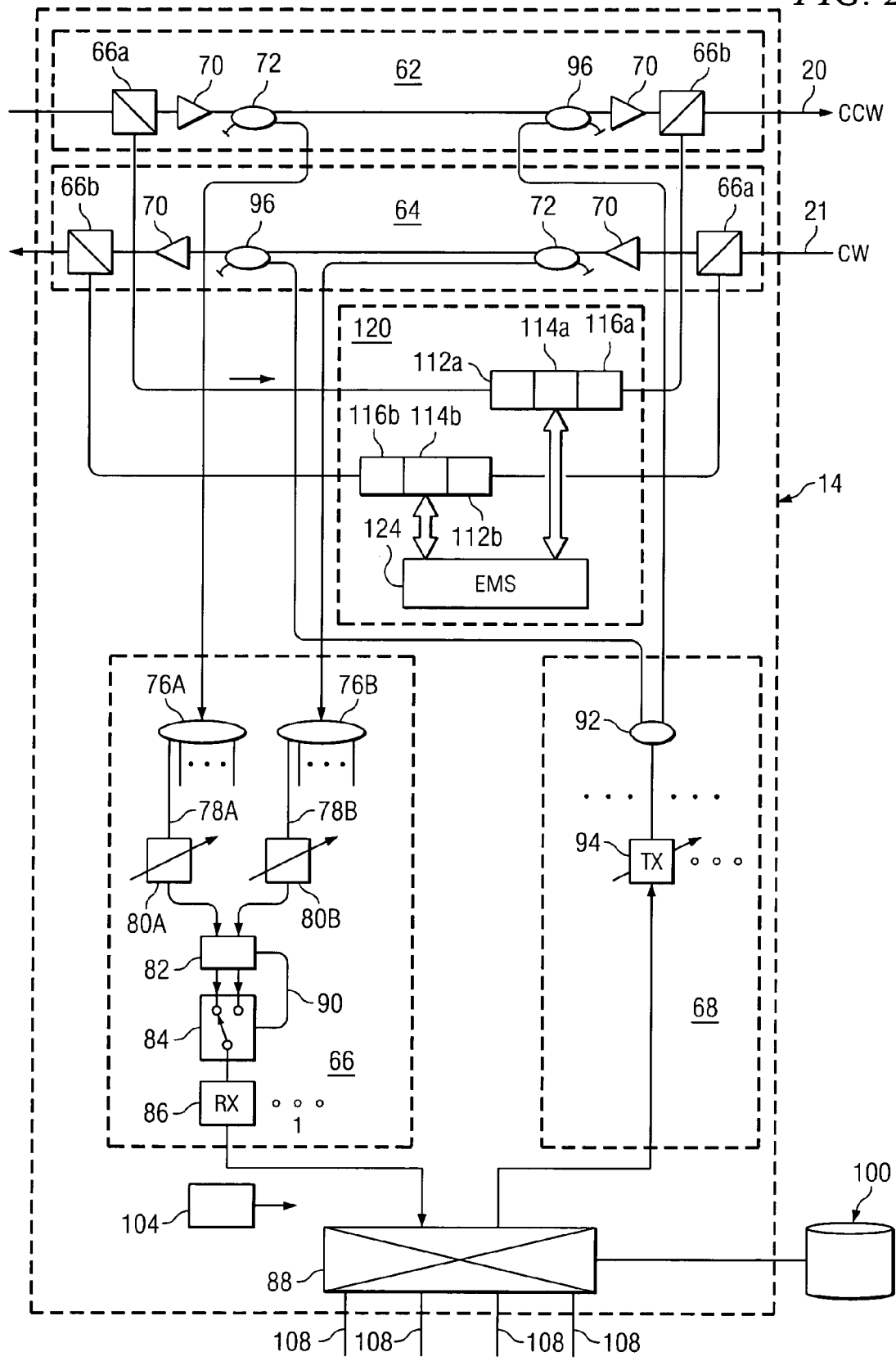
FIG. 2 is a block diagram illustrating a particular embodiment of a local node that may be utilized in the optical network shown in FIG. 1.

Each local node 14 electrically converts traffic received on the receiving wavelengths, discarding traffic transmitted at other wavelengths. Local nodes 14 then extract, based on addressing information in the traffic, portions of this traffic destined for client devices coupled to that local node 14. Addressing information may include a header, a VLAN tag, and/or any other suitable addressing information. In certain embodiments, each local node 14 comprises a switch element (not shown in FIG. 1) which may forward the traffic, or a portion thereof, to one of a plurality of client devices based on addressing information. In particular embodiments, the switch element comprises a Layer 2 (L2) switch. Additionally, the switch element may be configured, where appropriate, to determine a local port to which traffic should be forwarded based on a header or VLAN tag in the addressing information. FIG. 2 illustrates the contents and operation of a particular embodiment of local node 14 in greater detail.

In a particular embodiment, each local node 14 is also operable to generate optical traffic at one or more wavelengths, referred to here as "transmitting wavelengths." Local nodes 14 are operable to add this optical traffic to optical network 20. Although the description below focuses, for purposes of simplicity, on embodiments of optical network 10 in which each local node 14 transmits at a single transmitting wavelength, particular embodiments of optical network 10 may be configured such that each local node 14 transmits at a plurality of transmitting wavelengths.

Furthermore, one or more of these transmitting wavelengths may be shared by two or more local nodes 14 on optical network 10. In particular embodiments, all local nodes 14 may share one or more transmitting wavelengths utilized in optical network 10. In alternative embodiments, one or more of the transmitting wavelengths may be utilized by only a particular subset of local nodes 14, as appropriate based on the characteristics and configuration of that embodiment of optical network 10. As a result of this sharing of transmitting wavelengths, certain elements of optical network 10 may be responsible for managing the use of transmitting wavelengths to ensure that only a single component is transmitting on a particular transmitting wavelength at any given time and to prevent optical interference between the transmissions of different local nodes 14.

Meanwhile, during operation, hub node 12 receives optical traffic transmitted by local nodes 14, processes the received optical traffic in any appropriate manner, and transmits this optical traffic at one or more receiving wavelengths to appropriate local nodes 14 and/or to components on external networks coupled to hub node 12 through external connections 26. Hub node 12 may also receive optical traffic from external networks through external connections 26 and may transmit this optical traffic to local nodes 14 at one or more receiving wavelengths. In a particular embodiment of optical network 10, hub node 12 also manages use of shared transmitting wavelengths to prevent optical interference between local nodes 14. FIGS. 3A-3E and 4A-4D below illustrate examples of the operation of hub node 12 in facilitating the sharing of a common transmitting wavelengths between multiple local nodes 14. Hub node 12 may also store data locally or have access to remotely-stored data, and hub node 12 may transmit this data to local nodes 14 in response to requests from local nodes 14. For example, hub node 12 may have access to video data stored in an appropriate location within optical network 10 and may support Video on Demand (VOD) service to local nodes 14 by transmitting this video data to local nodes 14 in response to requests from these local nodes 14.

Thus, optical network 10 supports optical communication between local nodes 14 and/or other components of optical network 10 or other network coupled to optical network 10. Because local nodes 14 share a common transmitting wavelength, particular embodiments of optical network 10 may be able to make efficient use of the spectrum of wavelengths supported by those embodiments of optical network 10. As a result, such embodiments may provide greater data transmission rates and/or other additional benefits.

FIG. 2 illustrates a particular embodiment of local node 14 that may be utilized in the example optical network 10 shown in FIG. 1. As illustrated, local node 14 comprises a first transport element 62, a second transport element 64, a transmitting element 68, a receiving element 66 and a managing element 120. In a particular embodiment, local node 14 receives electrical signals from client devices (not shown) coupled to local node 14, generates optical traffic from these electrical signals, and adds the optical traffic to optical traffic propagating on fiber 16 and/or fiber 18. Additionally, local node 14 may also receive optical traffic on fiber 16 and/or fiber 18 and convert this optical traffic to electrical signals that are transmitted to an appropriate client device. Although FIG. 2 illustrates an example embodiment of local node 14 in which local node 14 couples to both fibers 16 and 18, particular embodiments of optical network 10 may include only a single fiber and local node 14 may be modified as appropriate to operate in such an embodiment of optical network 10.

Transport element 62 and 64 couple optical signals generated by local node 14 to fibers 16 and 18 and drop a copy of optical signals propagating on fibers 16 and 18 for use by other components of local node 14. Additionally, transport elements 62 and 64 each include an OSC ingress filter 66a that processes an ingress optical signal from its respective fiber 16 or 18. Each OSC filter 66a filters the OSC signal from the optical signal and forwards the OSC signal to managing element 120. Each OSC filter 66a also forwards or lets the remaining optical signal pass to other components of the relevant transport element. Transport elements 62 and 64 each also include an OSC egress filter 66b that adds an OSC signal from managing element 120 to the optical signal from an amplifier 70 and forwards the combined signal as an egress transport signal to the associated fiber 16 or 18 of optical network 10. The added OSC signal may be locally generated data or may be received OSC data passed through by managing element 120.

Managing element 120 may comprise OSC receivers 112, OSC interfaces 114, OSC transmitters 116, and an element management system (EMS) 124. FIG. 2 illustrates an embodiment of local node 14 configured for use in an optical network 10 in which the OSC represents a particular wavelength of optical traffic propagating on fibers 16 and 18 and received as a component of the aggregate optical traffic on fibers 16 and 18. As a result, the illustrated embodiment of local node 14 includes an OSC unit for each of fiber 16 and 18 that includes an OSC receiver 112, an OSC interface 114, and an OSC transmitter 116. The OSC units receive OSC signals from and transmit OSC signals to EMS 124.

EMS 124 monitors and/or controls any appropriate elements in local node 14 based, in part, on information received by local node 14 in the OSC signal. For example, EMS 124 may determine based on information received from hub node 12 in the OSC signal to begin transmitting optical traffic on the shared transmitting wavelength. As described in greater detail below with respect to FIGS. 3A-3E and 4A-4D, this data may represent control signals that manage the use of one or more shared transmitting wavelengths by local node 14. In general, EMS 124 may include any combination of hardware and/or software appropriate for providing the functionality described below. In a particular embodiment, EMS 124 comprises logic encoded in media for performing the described functions. This logic may comprise software encoded in a disk or other computer-readable medium, such as a memory associated with EMS 124, and/or instructions encoded in an application-specific integrated circuit (ASIC), field programmable gate array (FPGA), or other processor or hardware.

Transmitting element 68 generates local add traffic to be added to fibers 16 and 18 by transport elements 62 and 64. In particular embodiments, transmitting element 68 generates this local add traffic based on electrical signals received by local node 14 from client devices coupled to local node 14. As shown, transmitting element 68 includes one or more couplers 92 and one or more transmitters 94.

Receiving element 66 receives a copy of optical traffic that is dropped from fibers 16 and 18 by transport elements 62 and 64. In particular embodiments, receiving element 66 transmits portions of this local drop traffic to appropriate client devices coupled to local node 14. As shown, receiving element 66 includes one or more couplers 76, one or more tunable filter 80, one or more selectors 82, one or more switches 84, one or more receivers 86, and a switch element 88.

In particular embodiments, the transport, transmitting, and receiving elements 62, 64, 68, and 66 may each be implemented as a discrete card and interconnected through a backplane of a card shelf of the node 14. Alternatively, the functionality of one or more elements 62, 64, 68, and 66 may be distributed across a plurality of discrete cards. In this way, the node 14 is modular, upgradeable, and provides a "pay-as-you-grow" architecture. The components of node 14 may be coupled by direct, indirect or other suitable connection or association. In the illustrated embodiment, the elements 62, 64, 68, and 66 and devices in the elements are connected with optical fiber connections; however, other embodiments may be implemented in part or otherwise with planar wave guide circuits and/or free space optics.

In operation, transport elements 62 and 64 receive optical traffic that is propagating on fibers 16 and 18. In one embodiment, transport elements 62 and 64 each comprise amplifiers 70, a drop coupler 72, and an add coupler 74. Amplifiers 70 amplify the optical signals. Drop coupler 72 is operable to split the optical signal into a drop signal and a pass-through signal, wherein both signals are substantially the same. In addition, the transport elements 62 and 64 each comprise an add coupler 74 operable to combine both the traffic generated at transmitting element 68 and the pass-through signal.

Drop couplers 72 and 74 may each comprise an optical fiber coupler or other optical splitter operable to combine and/or split an optical signal. As used herein, an optical splitter or an optical coupler is any device operable to combine or otherwise generate a combined optical signal based on two or more optical signals and/or to split or divide an optical signal into discrete optical signals or otherwise passively discrete optical signals based on the optical signal. The discrete signals may be similar or identical in frequency, form, and/or content. For example, the discrete signals may be identical in content and identical or substantially similar in power, may be identical in content and differ substantially in power, or may differ slightly or otherwise in content. In one embodiment, each drop coupler 72 may split the signal into two copies with substantially different power.

Amplifiers 70 may be Erbium-doped fiber amplifiers (ED-FAs) or other suitable amplifiers capable of receiving and amplifying an optical signal. To reduce the optical power variations of the clockwise ring 18 and of the counterclockwise ring 20, amplifiers 70 may use an automatic level control (ALC) function with wide input dynamic-range. Hence amplifiers 70 may deploy automatic gain control (AGC) to realize gain-flatness against input power variation, as well as variable optical attenuators (VOAs) to realize ALC function.

During operation of local node 14, amplifier 70 of each transport element 62 and 64 receives a signal from the connected fiber 16 or 18 and amplifies the signal. The amplified signal is forwarded to the drop coupler 72. The drop coupler 72 splits the signal into a pass-through signal and a drop signal. The drop signal includes at least a subset of the set of wavelengths assigned to local node 14. The pass-through signal is forwarded to the add filter 74. The local drop signal is forwarded from the drop coupler 72 to receiving element 66, which selectively passes traffic in one or more $\lambda_S$ of the drop signal to a receiver 86. The add filter 74 combines the pass-through signal and signals generated by the transmitting element 68.

In the illustrated embodiment, receiving element 66 includes 1×n couplers 76, a plurality of tunable (or fixed) filters 80, a plurality of selectors 82, a plurality of 2×1 switches 84, one or more receivers 86, and switch element 88. The 1×n couplers 76 may comprise one optical fiber lead and a plurality of optical fiber leads which serve as drop leads 78. Drop leads 78 may be connected to the plurality of tunable filters 80 operable to pass traffic in a selected wavelength and reject other wavelengths. In the illustrated embodiment, drop lead 78a associated with fiber 16 and drop lead 78b associated with fiber 18 are coupled to tunable filters 80a and 80b, respectively.

The selected wavelengths from 80a and 80b are passed to the selector 82 and switch 84, which allows selective connection of the receiver 86 with either an associated drop signal coming from optical ring 20 or an associated drop signal coming from the ring 18. Such selective switching may be used to implement Optical Unidirectional Path-Switched Ring (OUPSR) protection switching. In a particular embodiment, the selector 82 is initially configured to forward to the client device(s) traffic from a fiber 16 or 18 that has the lower Bit Error Rate (BER). A threshold value is established such that the switch remains in its initial state as long as the BER does not exceed the threshold. Another threshold or range may be established for power levels. For example, if the BER exceeds the BER threshold or if the power falls above or below the preferred power range, the switch selects the other signal. Commands for switching may be transmitted via connection 90. This results in local control of switching and simple and fast protection. After optical-to-electrical conversion of the signal, receiver 86 transmits data segments, to switch element 88. Although the description below focus on an embodiment of hub node 12 in which receiver 86 forwards data segments to switch element 88 as frames, receiver 86 may forward data segments to switch element 88 in any appropriate form. Additionally, although FIG. 2 shows only a single receiver 86, local node 14 may include any number of receivers 86 with appropriate numbers of all associated equipment including filters 80, selectors 82, and switches 84. As a result, local node 14 may be capable of receiving optical signals on one or more receiving wavelengths.

Switch element 88 may comprise any appropriate switch such as, for example, an L2 switch, an L3 switch, or any other suitable switch. Upon receiving frames, switch element 88 determines a destination client device for frames based on addressing information and transmits frames to a client port 108 coupled to the destination client device. Some or all frames may contain addressing information such as IP addresses, VLAN tags, or any other suitable information identifying the destination client in any appropriate manner. Switch element 88 may determine an appropriate port 108 for the frames based on this addressing information and/or any other appropriate information.

Switch element 88 also receives, through client ports 108, frames or data segments of another suitable form from client devices for transmission on network 10. Switch element 88 transmits frames to transmitting element 68. In the illustrated embodiment, transmitting element 68 comprises a 2×n coupler 92 and a transmitter 94 that transmit the frames into a plurality of optical signals transmitted in one or more wavelengths assigned to the node 14. The 2×n coupler 92 comprises a plurality of leads which serve as add leads and may be connected to the one or more transmitters 94 (which may be tunable or fixed-wavelength). The transmitters 94 are operable to transmit add signals at selected wavelengths. The coupler 92 splits the add signal into two substantially similar signals, wherein one signal is added to the fiber 16 and the other signal is added to the fiber 18. The add signals are forwarded to the add filters 74 for addition to the associated fiber 16 or 18, as described above. The add filters 74 rejects signals transmitted at the assigned subband and combines the pass-through signal with the add signals transmitted at the assigned subband by the transmitting element 68. Although FIG. 2 shows only a single transmitter 94, local node 14 may include any number of transmitters 94 with appropriate numbers of all associated equipment. As a result, local node 14 may be capable of transmitting optical signals on one or more transmitting wavelengths.

In the illustrated embodiment, the same or substantially the same signals are communicated over both the fibers 16 and 18. Therefore, a single set of the receivers 86 may be used to receive signals from the fibers 16 or 18 (one or the other are received, depending on the position of switch 84 and selector 82), the same set of the transmitters 94 may be used to transmit the same signals to both the fibers 16 and 18. Such a configuration is appropriate when providing OUPSR protection. However, in other embodiments, local node 14 may include a separate set of the receivers 86 associated with each of fibers 16 and 18, and a separate set of the transmitters 94 associated with each of fibers 16 and 18. In this case, no switch 84 and selector 82 are needed. Instead, the drop signals associated with each fiber 16 or 18 are coupled to the set of the receivers 86 associated with each ring. Therefore, different signals may be received from the fibers 16 and 18.

Similarly, instead of splitting the signal from one or more transmitters 94 using a coupler 92 and providing this signal to both the fibers 16 and 18, a different signal may be generated by one or more transmitters 94 associated with the fiber 16 and one or more transmitters 94 associated with the fiber 18. Therefore, different signals may be communicated over each fiber 16 and 18. For example, a first signal can be added in a particular channel on the fiber 16 at the node 14, and an entirely different signal can be added in the same channel on the fiber 18 by the same node 14.

FIGS. 3A-3E[?] illustrate operation of a particular embodiment of optical network 10 in transmitting optical traffic from local node 14d to local node 14a. In the illustrated embodiment of optical network 10, all local nodes 14 share a common transmitting wavelength, $\lambda_T$, for transmitting optical traffic to hub node 12 and hub node 12 utilizes a receiving wavelength, $\lambda_R$, to transmit traffic to all local nodes 14. Furthermore, in this example embodiment, local nodes 14 are configured to determine whether another local node 14 is currently using the shared transmitting wavelength before transmitting optical traffic. If another local node 14 is transmitting, local node 14 will wait until the transmitting local node 14 has finished transmitting before being using $\lambda_T$ and/or requesting use of $\lambda_T$. By contrast, as described in greater detail below, FIGS. 4A-4D illustrate operation of an alternative embodiment of optical network 10 in which local nodes 14 request use of $\lambda_T$ from hub node 12 and hub node 12 determines, based on a priority level of the requesting local node 14, whether to grant the requesting local node 14 use of $\lambda_T$.

Figure 3A:
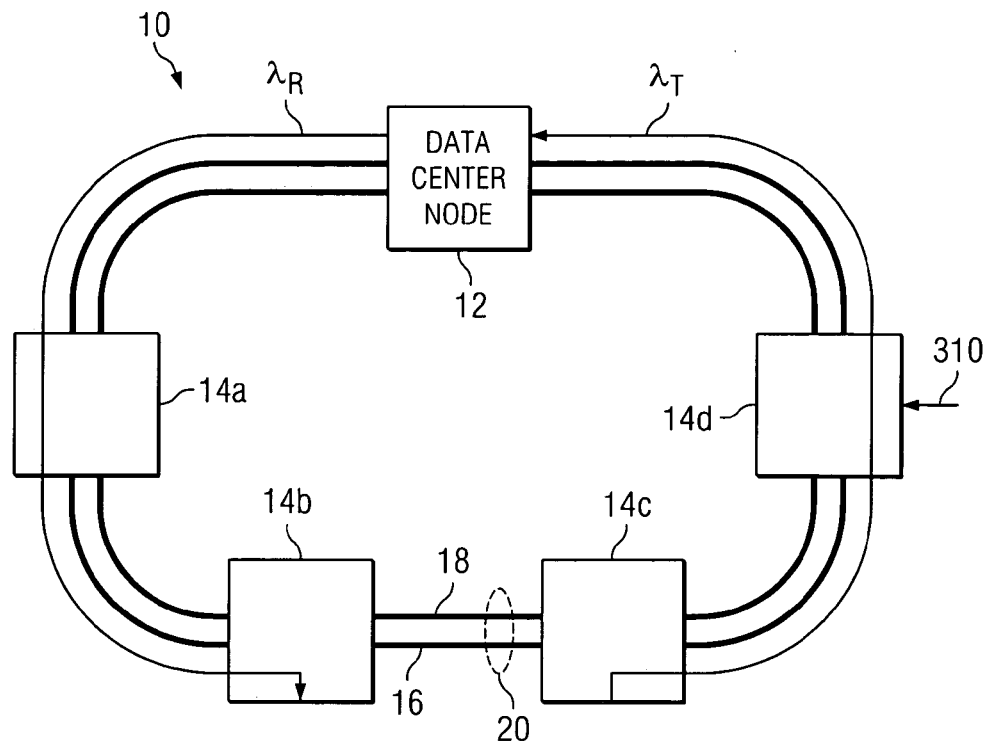
FIGS. 3A-3E illustrate an example operation of a particular embodiment of the optical ring network shown in FIG. 1.

FIG. 3A illustrates operation of optical network 10 as local node 14d receives traffic (as electrical signals) from a client device to be transmitted on optical ring 20 in $\lambda_T$. In the illustrated example, however, local node 14c is already transmitting optical traffic to local node 14b. As a result, in this example embodiment of optical network 10, local node 14d determines that local node 14d can not transmit on $\lambda_T$ and local node 14 waits until $\lambda_T$ is free before transmitting the traffic to local node 14a.

More specifically, local node 14d receives client traffic 310 from a client device coupled to local node 14d. Client traffic 310 may represent any appropriate electrical signal to be transmitted to hub node 12 or another local node 14 on optical network 10, in this case local node 14a. Upon receiving client traffic 310, local node 14d determines whether another local node 14 is currently transmitting on $\lambda_T$. Local node 14d may determine whether $\lambda_T$ is currently being used in any appropriate manner. As one example, hub node 12 or a transmitting local node 14 may transmit a control signal in the OSC while the transmitting local node 14 is transmitting. In such an embodiment, EMS 124 or another appropriate component of local node 14d may sample the OSC signal when local node 14d receives client traffic 310 and may determine based on this sampling whether $\lambda_T$ is currently being used. As another example, hub node 12 may transmit a control signal in the OSC to all local nodes 14 when a particular local node 14 requests use of $\lambda_T$ or begins using $\lambda_T$ and may transmit another control signal when that local node 14 is done transmitting. EMS 124 may set a flag or otherwise store information in memory or EMS indicating the current status of $\lambda_T$ and local node 14d may, upon receiving client traffic 310, check memory to determine whether $\lambda_T$ is currently being used. In general, however, local nodes 14 may determine in any appropriate manner whether another local node 14 is currently transmitting traffic on $\lambda_T$.

If no other local node 14 is transmitting on $\lambda_T$, local node 14d, in the illustrated embodiment, requests use of $\lambda_T$ from hub node 12 and/or begins using $\lambda_T$. If another local node 14 is transmitting on $\lambda_T$, local node 14, in the illustrated embodiment, waits until the transmitting local node 14 finishes its use of $\lambda_T$. During this period, local node 14d may monitor control signals transmitted by hub node 12 on the OSC channel to determine when the transmitting local node 14 has completed its transmission. Additionally, in a particular embodiment, local node 14d may include a buffer and local node 14d may buffer client traffic 310 until $\lambda_T$ is available for use by local node 14d. In the illustrated example, local node 14c is currently transmitting on $\lambda_T$, so local node 14d waits until local node 14c finishes transmitting.

Figure 3B:
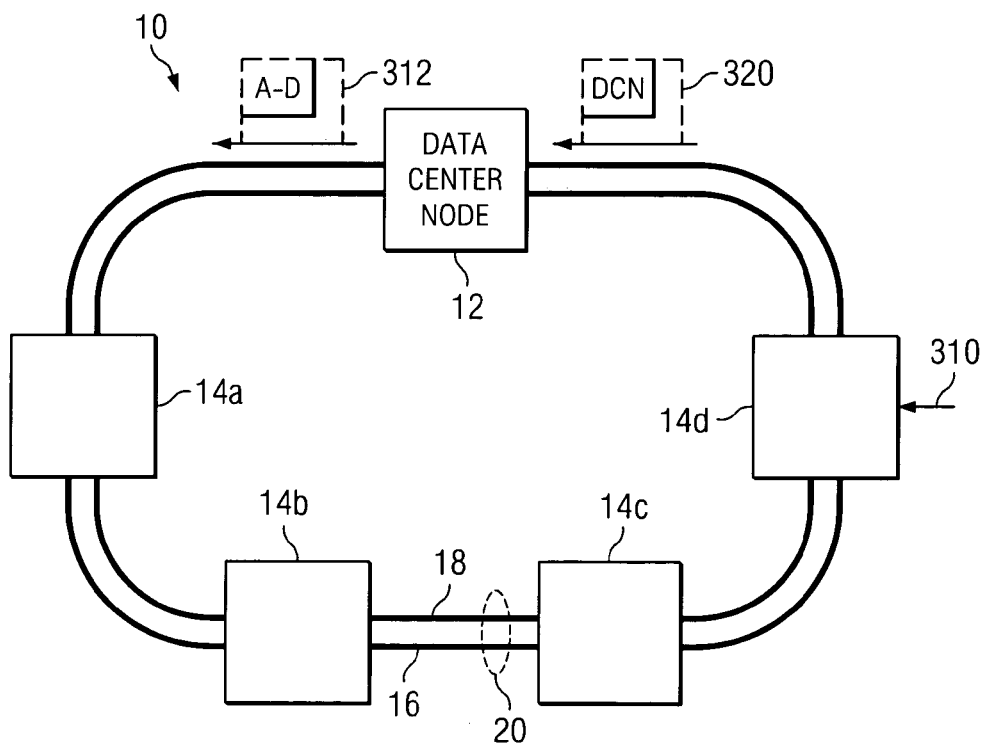

FIG. 3B illustrates operation of optical network 10 after local node 14c finishes transmitting on $\lambda_T$. At an appropriate point after local node 14c has finished transmitting, local node 14d determines that $\lambda_T$ is available. As noted above, local node 14 may determine that $\lambda_T$ is available in any appropriate manner, including by monitoring the OSC and by accessing information stored in memory. For example, in the illustrated embodiment, hub node 12 transmits an idle message 312 on the OSC to all local nodes 14 when local node 14c finishes transmitting and local node 14d determines that $\lambda_T$ is available in response to receiving idle message 312. As used in this description and the associated claims, a "message" may represent one or more signal pulses, packets, or frames, or information structured in any other suitable format. Idle message 312 may include any appropriate information indicating that a particular local node 14 previously transmitting on $\lambda_T$ has completed its transmission or that $\lambda_T$ is otherwise available. In this example, idle message 312 is transmitted to local nodes 14a-d, as indicated by the "A-D" label inside idle message 312.

After determining that $\lambda_T$ is available, local node 14d, in the illustrated embodiment, requests use of $\lambda_T$ from hub node 12. In the illustrated embodiment, local node 14d requests use of $\lambda_T$ by transmitting a request message 320 to hub node 12 on the OSC. Request message 320 identifies a destination node 12 or 14 to which local node 14d is attempting to transmit optical traffic and any other appropriate information.

In an alternative embodiment, local node 14d may be allowed to use $\lambda_T$ unconditionally as long as no other local node 14 is transmitting. In such an embodiment, local node 14d may be configured to, once $\lambda_T$ is available, begin using $\lambda_T$ without requesting use from hub node 12. In such an embodiment, local node 14*d* may begin transmitting optical traffic on $\lambda_T$, as described below with respect to FIG. 3D, without transmitting request message 320 and/or receiving any further messages from hub node 12.

Figure 3C:
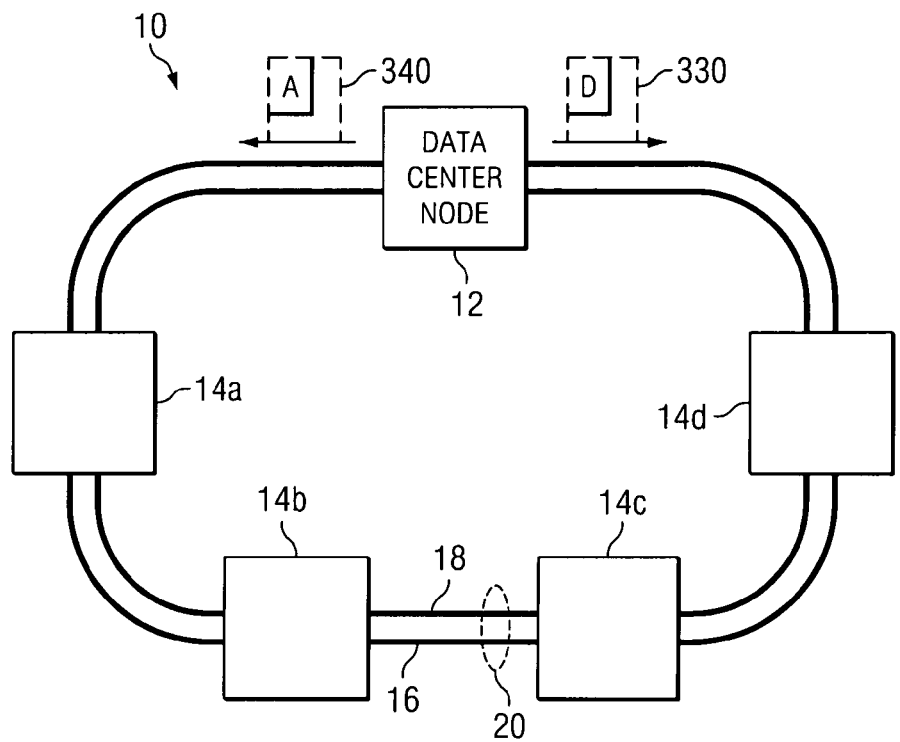

FIG. 3C illustrates operation of a particular embodiment of optical network 10 after hub node 12 receives request message 320. Upon receiving request message 320, if no other local node 14 has requested use of $\lambda_T$, hub node 12 may unconditionally grant local node 14*d* use of $\lambda_T$. Alternatively, hub node 12 may determine, based on any appropriate information, whether to grant local node 14*d* use of $\lambda_T$. For example, hub node 12 may determine based on access rights of local node 14*d* whether local node 14*d* should be granted use of $\lambda_T$ to communicate with the intended destination local node 14.

Hub node 12 then transmits a grant message 330 to the requesting local node 14, local node 14*d*, on the OSC. Grant message 330 indicates to local node 14*d* that local node 14*d* has been granted use of $\lambda_T$ for transmitting traffic to the destination local node 14 specified in request message 320. Grant message 330 may represent a single pulse, a packet, a frame, and/or information structured in any other suitable format.

In a particular embodiment, hub node 12 may also transmit an intimation message 340 to the intended destination, in this case local node 14*a*, on the OSC. Intimation message 340 may include any appropriate information to facilitate reception of optical traffic by local node 14*a* from local node 14*d*. As one example, intimation message 340 may specify the source local node 14, local node 14*d*, from which local node 14*a* should expect to receive traffic. As another example, in an embodiment of optical network 10 in which optical traffic is transmitted to local nodes 14 on multiple receiving wavelengths, intimation message 340 may indicate to local node 14*a* which the particular receiving wavelength on which optical traffic from local node 14*d* will be transmitted to local node 14*a*. In such an embodiment, local node 14*a* may use the information in intimation message 340 to retune one or more tunable filters and/or receivers of local node 14*a*.

Additionally, hub node 12 may notify, in any suitable manner, other local nodes 14 that local node 14*d* has been granted use of $\lambda_T$. As one example, hub node 12 may transmit grant message 330, intimation message 340, or some other appropriate form of messages on the OSC to all local nodes 14 to indicate that local node 14*d* has been granted use of $\lambda_T$. Other local nodes 14 may update information stored in their memory as a result of receiving such notification. Furthermore, in alternative embodiments, local node 14*d* may instead notify the other local nodes 14 that local node 14*d* will be using $\lambda_T$ by sending any appropriate messages to other local nodes 14 on the OSC after receiving grant message 330 from hub node 12.

Figure 3D:
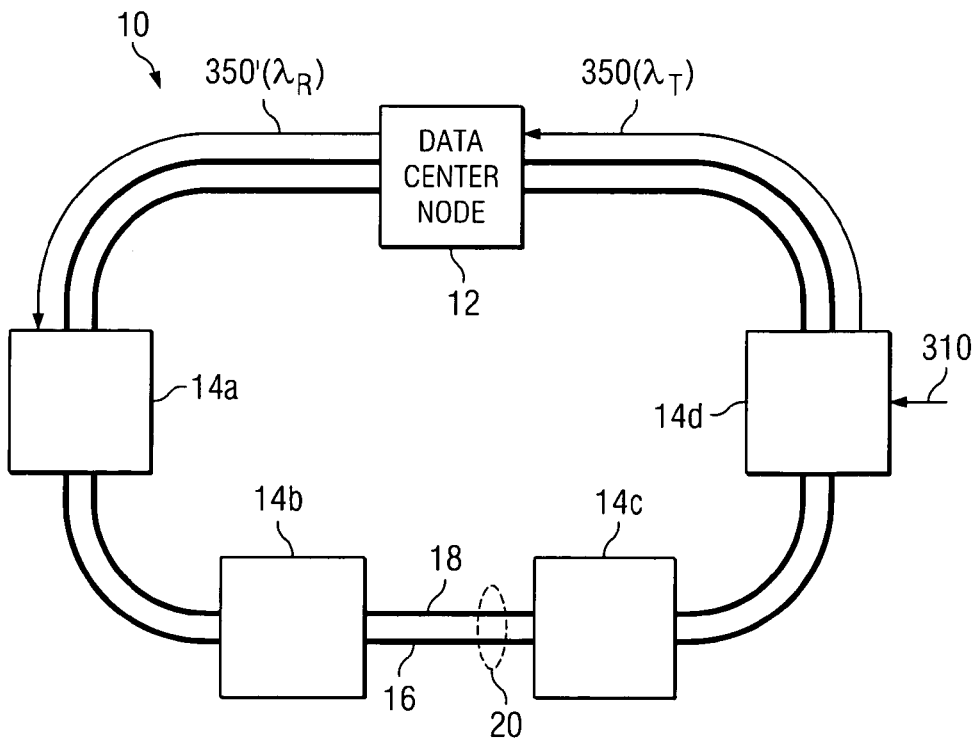

FIG. 3D illustrates operation of optical network 10 after local node 14*d* receives grant message 330. Upon receiving grant message 330, local node 14*d* begins transmitting optical traffic on $\lambda_T$. More specifically, local node 14*d* generates optical signals at a wavelength of $\lambda_T$, based on the electrical signals of client traffic 310, and transmits these optical signals on optical ring 20 as optical traffic 350. Although FIG. 3D shows, for the purposes of simplicity, local node 14*d* transmitting optical traffic counterclockwise on first fiber 16, local node 14*d* may transmit optical traffic 350 as appropriate on either or both of fibers 16 and 18. For example, in a particular embodiment of network 10, local node 14*d* may transmit identical copies of optical traffic 350 on each of first fiber 16 and second fiber 18 to ensure delivery of optical traffic 350 to destination local node 14*a*.

In the illustrated example, local node 14*d* transmits optical traffic 350 along first fiber 16 in a counterclockwise direction at a wavelength of $\lambda_T$. When hub node 12 receives optical traffic 350 in this embodiment, hub node 12 performs any appropriate processing, such as buffering optical traffic 350 or modifying header information included in optical traffic 350, and regenerates optical traffic 350 at wavelength $\lambda_R$. The regenerated optical traffic 350' is transmitted on first fiber 16.

Each of local nodes 14 may receive regenerated optical traffic 350' and drop a copy of regenerated optical traffic 350'. Each local node 14 may then forward the dropped copy of regenerated optical traffic 350' to appropriate client devices, if any, from among the client devices coupled to local node 14. For example, in the illustrated embodiment, local node 14*a* determines, based on addressing information within regenerated optical traffic 350' or any other appropriate information and/or considerations, that a client device coupled to local node 14*a* is the destination of regenerated optical traffic 350' and routes the dropped copy of regenerated optical traffic 350' to that client device. Meanwhile, each of the remaining local nodes 14 drops a copy of regenerated optical traffic 350' and determines, based on addressing information or other appropriate considerations, that none of the client devices attached to that local node 14 is the destination for regenerated optical traffic 350'. As a result, in the illustrated embodiment, each of these local nodes 14 discards their dropped copy of regenerated optical traffic 350'.

Figure 3E:
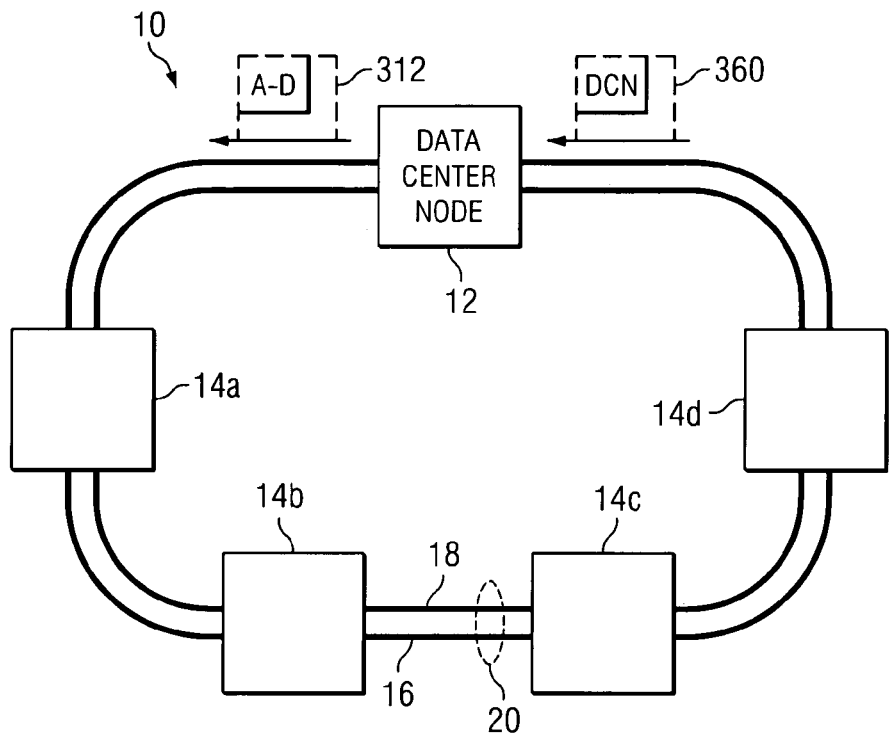

FIG. 3E illustrates operation of optical network 10 after local node 14*d* has completed its transmission to local node 14*a*. In the illustrated example, local node 14*d* transmits a termination message 360 to hub node 12 on the OSC after local node 14*d* has transmitted all of optical traffic 350 to local node 14*a*. Termination message 360 may include any suitable information local node 14*d* has completed transmission of optical traffic 350 and/or no longer requires the use of $\lambda_T$. Upon receiving termination message 360 from local node 14*d*, hub node 12 indicates to local nodes 14 that the transmitting wavelength is again available for use. In the illustrated example, hub node 12 indicates that $\lambda_T$ is now available by transmitting another idle message 312 to local nodes 14.

Thus, FIGS. 3A-3E illustrate a particular embodiment of optical network 10 that supports sharing of a transmitting wavelength by two or more local nodes 14. Furthermore, the illustrated embodiment of optical network 10 supports decentralized decision-making that allows each local node 14 to determine whether the transmitting wavelength is currently available and to request use of the transmitting wavelength from hub node 12 only when no other local node 14 is transmitting. Such an embodiment may reduce the workload of hub node 12 and/or congestion on the OSC.

Although FIGS. 3A-3E show, for the purposes of simplicity, an embodiment of optical network 10 in which messages between two components are transmitted on the OSC along the shortest path on optical ring 20 between the relevant components, particular embodiments of optical network 10 may utilize only a single direction for OSC signals and all OSC messages may be transmitted around optical ring 20 in the same direction. Alternatively, in particular embodiments of optical network 10, each message may be transmitted on optical ring 20 in both directions, with a first copy transmitted in one direction between the relevant components on first fiber 16 and a second copy transmitted in the other direction on second fiber 18. Additionally, although FIGS. 3A-3E illustrate a specific embodiment of optical network 10 that utilizes specific types of messages to facilitate sharing of the transmitting wavelength, alternative embodiments of optical network 10 may utilize some, none, or all of these messages to provide the describe functionality. For example, instead of transmitting idle messages 312 to local nodes 14 to indicate that $\lambda_T$ is available for use, hub node 12 may periodically transmit a refresh message indicating that $\lambda_T$ is currently being used by a particular local node 14 and a particular local node 14 may determine that $\lambda_T$ is available based on whether that local node 14 has received a refresh message from hub node 12 within a particular amount of time.

FIGS. 4A-4D illustrate another embodiment of optical network 10 in which a local node 14 may request use of the transmitting wavelength, $\lambda_T$, while another local node 14 is transmitting. In the embodiment of optical network 10 illustrated in FIGS. 4A-4D, hub node 12 determines, based on suitable criteria, whether a particular requesting local node 14 should be granted use of $\lambda_T$ when a particular transmitting local node 14 is already transmitting on $\lambda_T$. In particular, the illustrated embodiment of optical network, determines whether to grant use of $\lambda_T$ to a requesting local node 14 based on the priority statuses of the requesting local node 14 and the currently transmitting local node 14. Consequently, the embodiment of optical network 10 illustrated by FIGS. 4A-4D may provide more efficient use of $\lambda_T$ by allowing particular nodes preferred access to $\lambda_T$.

Figure 4A:
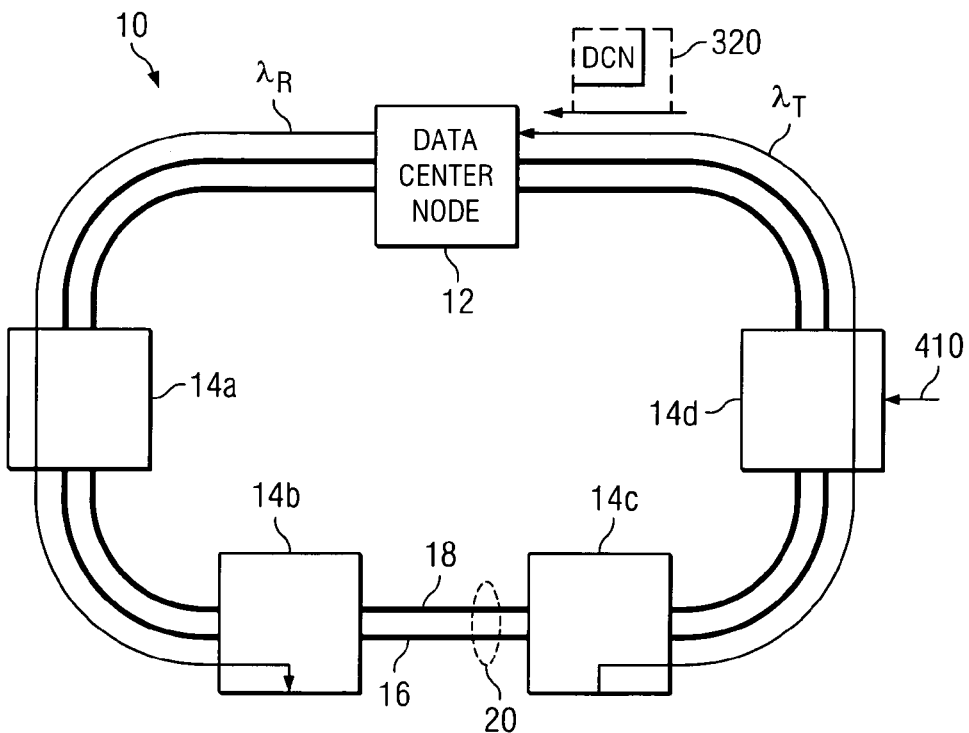
FIGS. 4A-4D also illustrate an example operation of a particular embodiment of the optical ring network shown in FIG. 1.

FIG. 4A illustrates operation of optical network 10 as local node 14d receives client traffic 410 (as electrical signals) from a client device to be transmitted on optical ring 20. In the illustrated example, however, local node 14c is already transmitting optical traffic at $\lambda_T$ to local node 14b. In this example embodiment of optical network 10, local node 14d may still request use of $\lambda_T$. More specifically, in response to receiving client traffic 410, local node 14d transmits a request message 420 to hub node 12 on the OSC. Request message 420 identifies a destination node 12 or 14 to which local node 14d is attempting to transmit optical traffic.

Request message 420 may also identify a priority status associated with local node 14d. Each local node 14 of optical network 10 is associated with a priority status. Each local node 14 or transmission may be associated with a particular priority status based on any appropriate characteristic of that local node 14, the information that local node 14 is attempting to transmit, and/or other characteristics, considerations, or factors associated with the requesting local node 14. Furthermore, the priority status of a particular local node 14 may change over time or based on the particular information that local node 14 is transmitting. For example, a particular transmission may be associated with a quality of service (QoS) requirement and hub node 12 may prefer that transmission over transmissions that are not associated with any QoS requirement. Alternatively, request message 420 may not include any priority status and hub node 12 may itself determine the priority status in any appropriate manner.

Figure 4B:
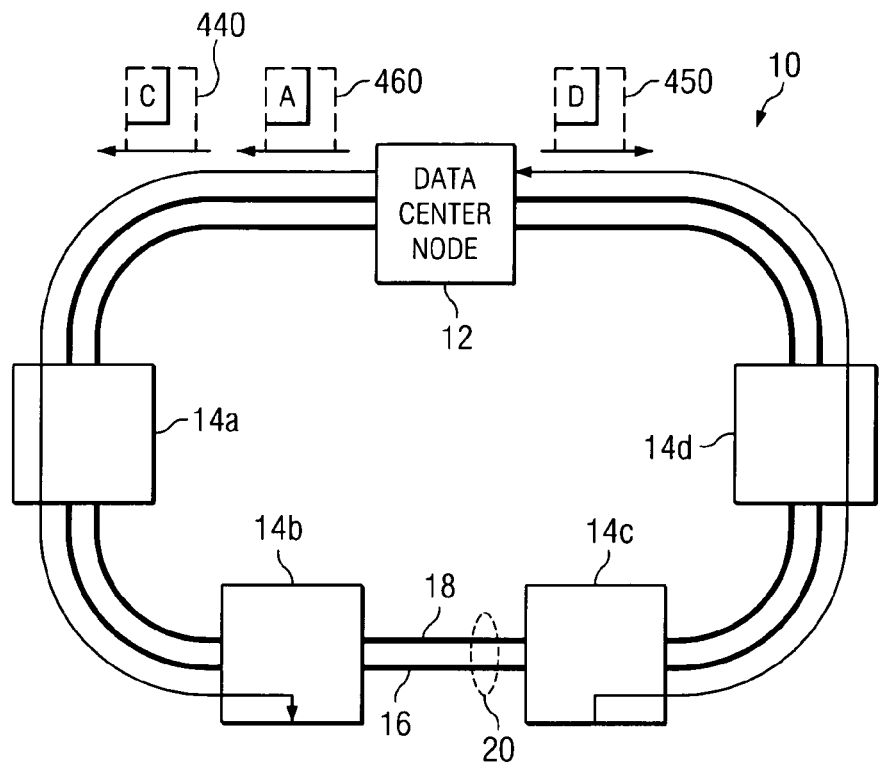

FIG. 4B illustrates operation of optical network 10 after local node 14d transmits request message 420 to hub node 12. In response to receiving request message 420, hub node 12 determines whether to allow local node 14d to interrupt the transmission by local node 14c. In particular, in the illustrated example, hub node 12 determines whether to allow local node 14d to interrupt the transmission based on the priority status of local node 14d and the priority status of local node 14c.

If hub node 12 decides not to allow local node 14d to interrupt the transmission by local node 14c, hub node 12 transmits a negation message (not shown). The negation message may include any appropriate information indicating to local node 14d that local node 14d has not been granted use of $\lambda_T$. If local node 14 receives the negation message, local node 14d may wait until local node 14c completes transmission, abort its own transmission, or take any other appropriate action. For example, local node 14d may buffer client traffic 410 in a buffer of local node 14d and wait a predetermined amount of time before requesting use of $\lambda_T$ again. In such an embodiment, the priority status of the transmission associated with client traffic 410 may be based, in part, on how long local node 14d has been waiting to transmit client traffic 410 on optical ring 20 and thus the priority status may change as local node 14d waits.

If instead hub node 12 decides to allow local node 14d to interrupt the transmission by local node 14c, hub node 12 may transmit an interruption message 440 to the currently transmitting local node 14, local node 14c, as shown. In response to interruption message 440, local node 14c terminates its current transmission. Hub node 12 also transmits an acknowledgement message 450 to the requesting local node 14, local node 14d. Acknowledgement message 450 may include any appropriate information indicating to local node 14d that local node 14d may use $\lambda_T$.

Hub node 12 may also transmit an intimation message 460 to the intended destination, local node 14a, on the OSC. Intimation message 460 may include any appropriate information to facilitate reception of optical traffic by local node 14a from local node 14d. In response to intimation message 460, local node 14a may configure local node 14a in any appropriate manner to facilitate receipt of optical traffic from local node 14d.

Figure 4C:
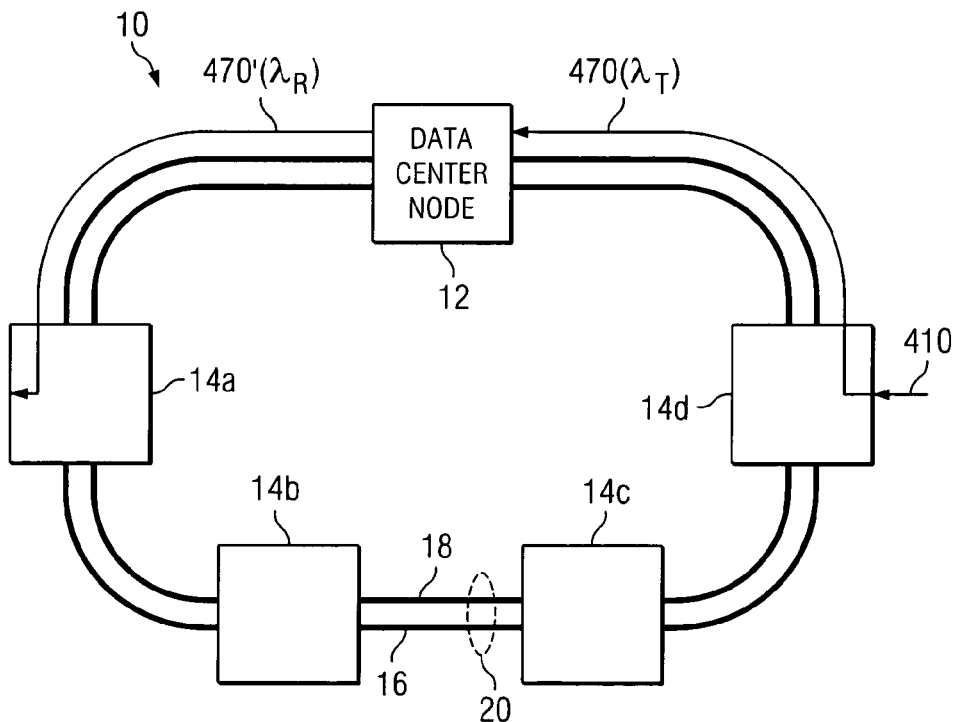

FIG. 4C illustrates operation of local node 14d after receiving acknowledgement message 450. In response to receiving acknowledgement message 450, local node 14 begins transmitting optical traffic on $\lambda_T$. More specifically, local node 14d generates optical signals at a wavelength of $\lambda_T$, based on the electrical signals of client traffic 410, and transmits these optical signals on optical ring 20 as optical traffic 470. Although FIG. 4C shows, for the purposes of simplicity, local node 14d transmitting optical traffic counterclockwise on first fiber 16, local node 14d may transmit optical traffic 470 as appropriate on either or both of fibers 16 and 18. For example, in a particular embodiment of network 10, local node 14d may transmit identical copies of optical traffic 470 on each of first fiber 16 and second fiber 18 to ensure delivery of optical traffic 470 to destination local node 14a.

In the illustrated example, local node 14d transmits optical traffic 470 along first fiber 16 in a counterclockwise direction at a wavelength of $\lambda_T$. When hub node 12 receives optical traffic 470 in this embodiment, hub node 12 performs any appropriate processing, such as buffering optical traffic 470 or modifying header information included in optical traffic 470, and regenerates optical traffic 470 at wavelength $\lambda_R$. The regenerated optical traffic 470' is transmitted on first fiber 16.

Each of local nodes 14 may receive regenerated optical traffic 470' and drop a copy of regenerated optical traffic 470'. Each local node 14 may then forward the dropped copy of regenerated optical traffic 470' to appropriate client devices, if any, from among the client devices coupled to local node 14. For example, in the illustrated embodiment, local node 14a determines, based on addressing information within regenerated optical traffic 470' or any other appropriate information and/or considerations, that a client device coupled to local node 14a is the destination of regenerated optical traffic 470' and routes the dropped copy of regenerated optical traffic 470' to that client device. Meanwhile, each of the remaining local nodes 14 drops a copy of regenerated optical traffic 470' and determines, based on addressing information or other appropriate considerations, that none of the client devices attached to that local node 14 is the destination for regenerated optical traffic 470'. As a result, in the illustrated embodiment, each of these local nodes 14 discards their dropped copy of regenerated optical traffic 470'.

Additionally, another local node 14 may interrupt the transmission by local node 14*d*. If another local node 14 requests use of $\lambda_T$ for a transmission that has a priority status higher than that associated with client traffic 410, hub node 12 may decide to interrupt the transmission of optical traffic 470. Hub node 12 may interrupt transmission of optical traffic 470 by transmitting interruption message 440 to local node 14*d*, as described above.

Figure 4D:
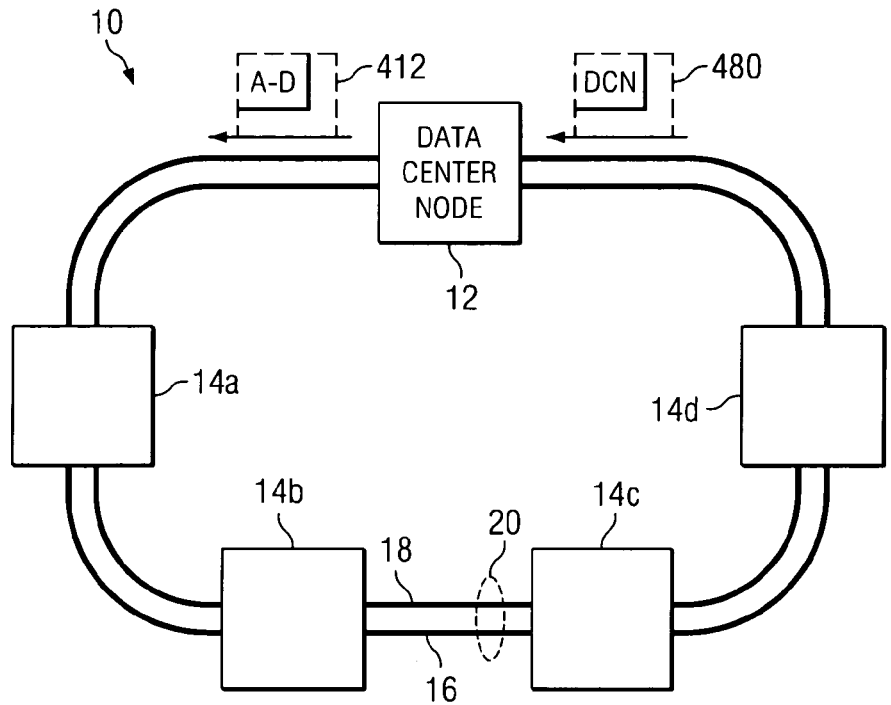

FIG. 4D illustrates operation of optical network 10 after local node 14*d* has completed its transmission to local node 14*a*. In the illustrated example, local node 14*d* transmits a termination message 480 to hub node 12 on the OSC after local node 14*d* has transmitted all of optical traffic 470 to local node 14*a*. Termination message 480 may include any suitable information indicating local node 14*d* has completed transmission of optical traffic 470 and/or no longer requires the use of $\lambda_T$. Upon receiving termination message 480 from local node 14*d*, hub node 12 indicates to local nodes 14 that the transmitting wavelength is again available for use. In the illustrated example, hub node 12 indicates that $\lambda_T$ is now available by transmitting an idle message 412 to local nodes 14.

FIGS. 5A-5D illustrate another embodiment of optical network 10 in which a local node 14 may request use of the transmitting wavelength to transmit directly to another local node 14 that lies between the requesting local node 14 and hub node 12. The illustrated techniques allow a requesting local node 14 to request use of a particular wavelength over the portion of optical ring 20 that connects the requesting local node 14 to the destination local node 14. Because these techniques eliminate the need for traffic to be transmitted to hub node 12 before being transmitted to the destination local node 14, these techniques may reduce traffic on other portions of optical ring 20 and may reduce the workload of hub node 12.

In the illustrated example, local node 14*b* requests direct communication at a particular wavelength, $\lambda_S$. The requested wavelength may be a currently unused receiving wavelength, a currently unused transmitting wavelength, or any other appropriate wavelength. In alternative embodiments of optical network 10, local node 14*b* may not specify a requested wavelength, and hub node 12 may instead select a wavelength for direct communication and transmit information identifying the selected wavelength to local node 14*b* and/or local node 14*c*.

Figure 5A:
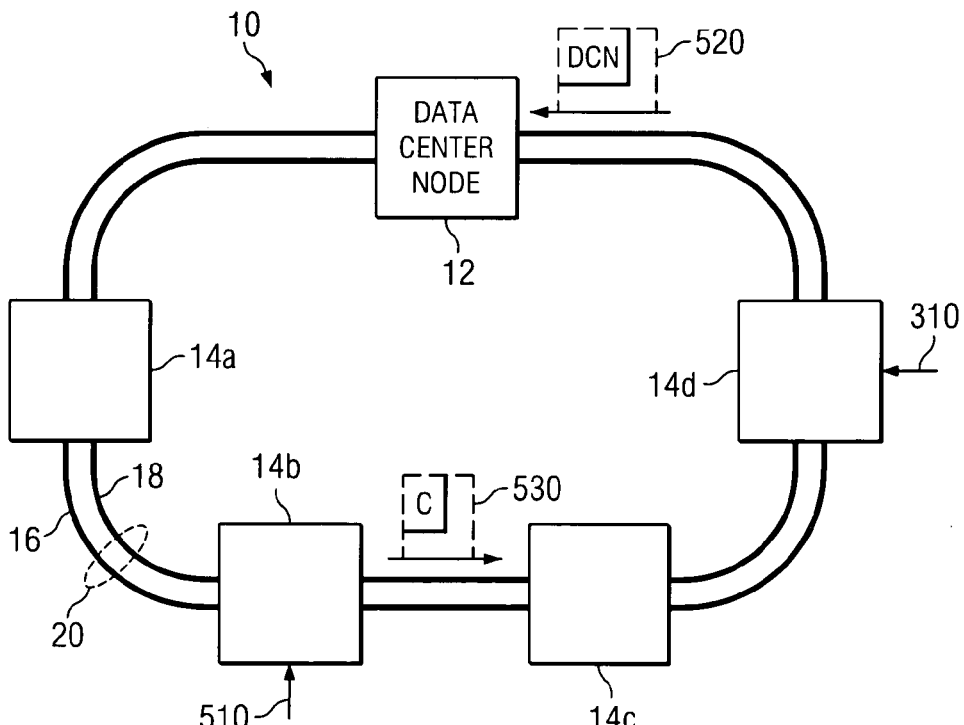
FIGS. 5A-5D illustrate another example operation of a particular embodiment of the optical ring network shown in FIG. 1.

FIG. 5A illustrates operation of optical network 10 as local node 14*b* receives client traffic 510 (as electrical signals) from a client device to be transmitted to local node 14*c* on optical ring 20. In this example, local node 14*b* decides based on appropriate criteria to request use of $\lambda_S$ for direct communication to node 14*c*. For example, in a particular embodiment, local node 14*b* determines whether to request use of $\lambda_S$ for direct communication to local node 14*c* based on whether the amount of traffic being transmitted to local node 14*c* is greater than a predetermined threshold.

If local node 14*b* decides to request use of $\lambda_S$ for direct communication, local node 14*b* transmits a request message 520 to hub node 12. Request message 520 indicates to hub node 12 that local node 14*b* is requesting use of $\lambda_S$ for direct communication with local node 14*c*. Request message 520 may include information identifying requesting local node 14*b* and/or destination local node 14*c* and/or any other appropriate information. Local node 14 may also transmit an intimation message 530 to local node 14*c*.

Local node 14 may also transmit an intimation message 530 to local node 14*c*. Intimation message 530 indicates to local node 14*c* that local node 14*b* will be transmitting information directly to local node 14*c*. Intimation message 530 may include information identifying requesting local node 14*b*, the transmitting wavelength on which requesting local node 14*b* will be transmitting, and/or any other appropriate information to be used by local node 14*c* to facilitate receipt of optical traffic from local node 14*c*.

Figure 5B:
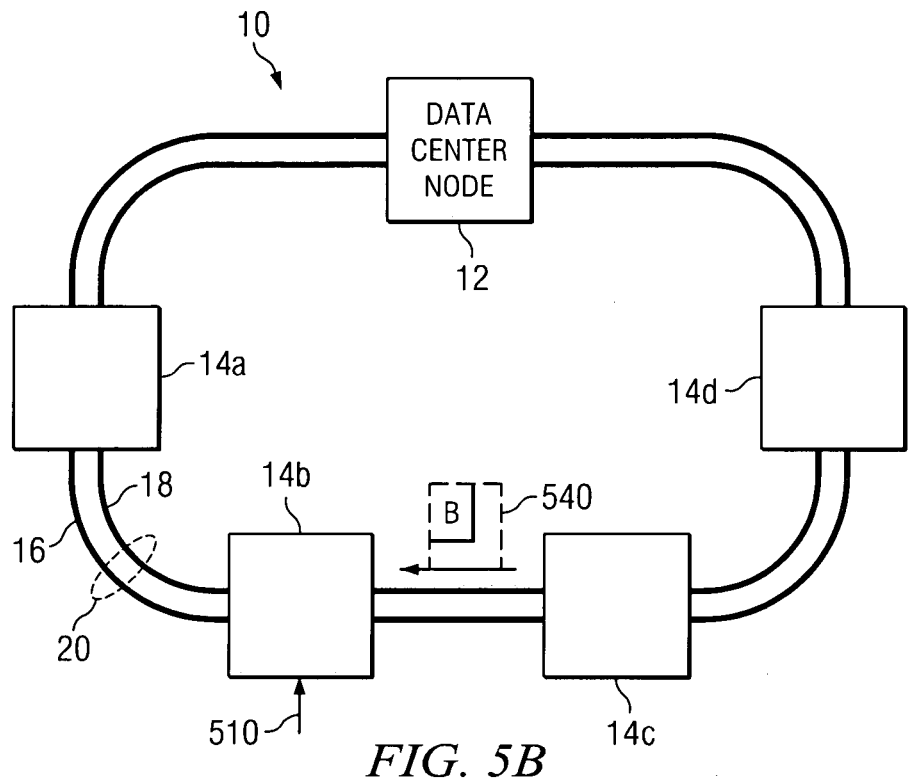

FIG. 5B illustrates operation of optical network 10 after local node 14*b* transmits intimation message 530 to local node 14*c*. In response to receiving intimation message 530, local node 14*c* may configure itself in any appropriate manner to facilitate reception of optical traffic from local node 14*b*. For example, in particular embodiment, intimation message 530 specifies the wavelength at which local node 14*b* will communicate optical traffic to local node 14*c*, and local node 14*c* may retune tunable filters and/or tunable receivers of local node 14*c* to receive optical traffic at the specified wavelength.

After configuring itself to receive optical traffic on the appropriate wavelength, local node 14*c* may inform both local node 14*b* and hub node 12 that local node 14*c* is ready to receive traffic from local node 14*b* directly. For example, in the illustrated example, local node 14*c* transmits a confirmation message 540 to hub node 12 and to local node 14*b*. Confirmation message 530 indicates to hub node 12 and local node 14*b* that local node 14*c* is ready to receive traffic directly from local node 14*b* at the selected wavelength and may include any appropriate information.

In response to receiving request message 520, hub node 12 may initiate any appropriate procedures to reserve use of $\lambda_S$ over the span of optical ring 20 between local node 14*b* and local node 14*c* for direct communication between local node 14*b* and local node 14*c*. For example, in the illustrated embodiment, hub node 12 may maintain a table of available wavelengths and may update this table to indicate that $\lambda_S$ is currently in use by local node 14*b*.

Figure 5C:
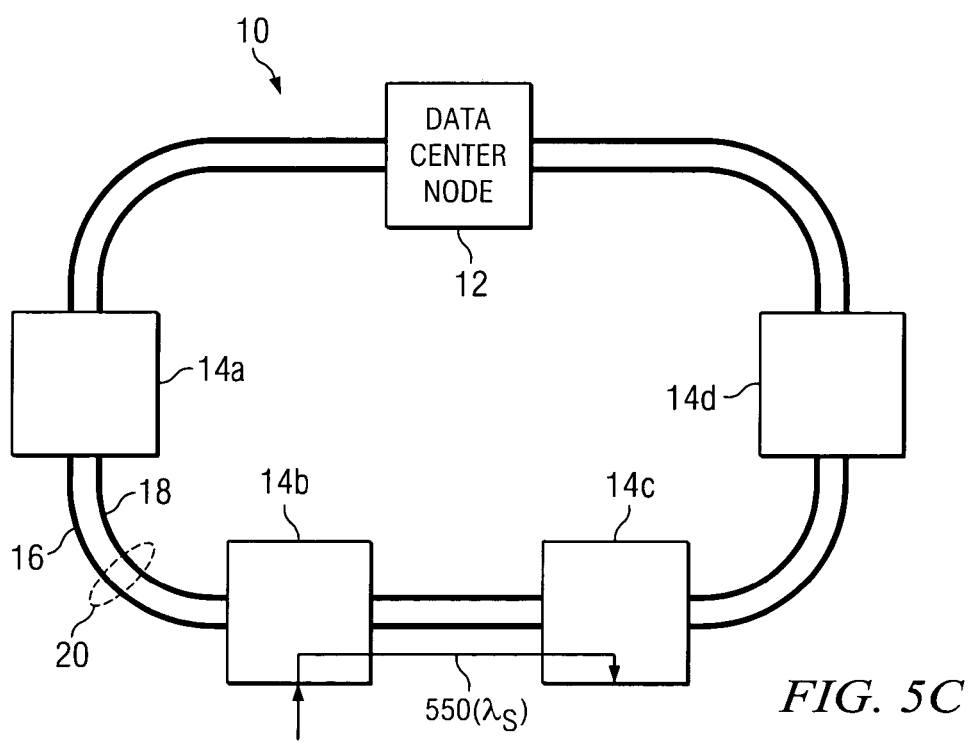

FIG. 5C illustrates operation of optical network 10 after local node 14*b* receives confirmation message 540 from local node 14*c*. In response to receiving confirmation message 540 from local node 14*c*, local node 14*b* begins generating optical traffic 540 from client traffic 510 and transmitting optical traffic 540 to local node 14*c* at $\lambda_S$. Because $\lambda_S$ is reserved for direct communication between local node 14*b* and local node 14*c* and because local node 14*c* has be tuned to receive optical traffic on $\lambda_S$, optical traffic 540 can be transmitted by local node 14*b* to local node 14*c* directly, as shown, without optical traffic 540 having to propagate around optical ring 20 to hub node 12 and/or be switched by hub node 12.

Figure 5D:
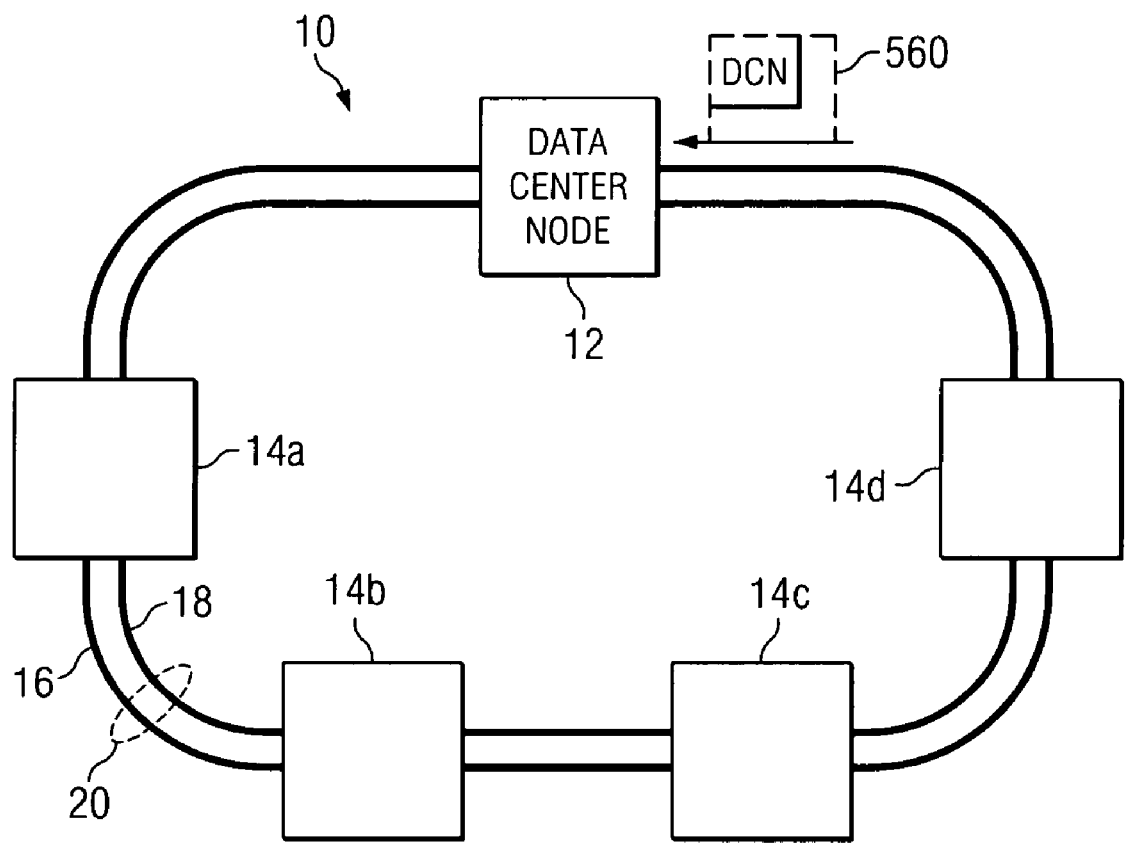

FIG. 5D illustrates operation of optical network 10 after local node 14*b* finishes transmitting optical traffic 540. After finishing transmission of optical traffic 540, local node 14*b* may transmit a termination message 550 to hub node 12. Termination message 550 indicates to hub node 12 that local node 14*b* has finished transmitting to local node 14*c* on $\lambda_S$. Termination message 550 may include information identifying local node 14*b* and/or the selected wavelength, and/or any other appropriate information to be used by hub node 12 to release $\lambda_S$ for other uses.

Additionally, local node 14*b* may also transmit termination message 550 to local node 14*c*. Alternatively, local node 14*c* may determine based on the loss of optical signal on $\lambda_S$ that local node 14*b* has finished transmitting optical traffic 540. In response to receiving termination message 550 or otherwise determining that local node 14*b* has finished transmitting optical traffic 540, local node 14*c* may reconfigure itself to return to operating in the same or a similar manner as local node 14*c* was operating before receiving intimation message 530. For example, local node 14*c* may retune a tunable filter or tunable receiver of local node 14*c* so that this filter or receiver receives optical traffic transmitted at a default receiving wavelength.

Using these techniques, local nodes 14 in particular embodiments of optical network 10 may improve efficiency of communication between local nodes 14. As optical traffic between two local nodes 14 communicated via node 12 approaches the full capacity of a particular wavelength, these embodiments of optical network 10 may enhance efficiency by switching to direct communication between the nodes 14. Direct communication can limit traffic on other portions of optical network 10, reduce traffic at hub node 12, and limit transmission times between local nodes 14 by both eliminating switching delay at hub node 12 and round-trip travel delay.

Although the present invention has been described with several embodiments, various changes and modifications may be suggested to one skilled in the art. It is intended that the present invention encompass such changes and modifications as fall within the scope of the appended claims.

What is claimed:

1. An optical network, comprising:
   an optical ring;
   a hub node coupled to the optical ring and operable to receive traffic over the optical ring from a plurality of local nodes on a transmitting wavelength and to transmit traffic over the optical ring to the local nodes on a receiving wavelength;
   the plurality of local nodes coupled to the optical ring and operable to add traffic to and drop traffic from the optical ring, wherein at least one local node is operable to add traffic to the optical ring by:
      determining whether any other local node is transmitting at the transmitting wavelength;
      in response to determining that no other local node is transmitting at the transmitting wavelength, transmitting a request message to the hub node requesting use of the transmitting wavelength;
      receiving a grant message from the hub node; and
      in response to receiving the grant message from the hub node, transmitting traffic at the transmitting wavelength.

2. The optical network of claim 1, wherein the local nodes are further operable to add traffic by transmitting traffic at the transmitting wavelength to the hub node, and wherein the hub node is further operable to transmit, at a receiving wavelength, the traffic received at the transmitting wavelength to a destination local node of the traffic.

3. The optical network of claim 1, wherein the local nodes are further operable to add traffic by transmitting traffic on the transmitting wavelength to a destination local node of the traffic, wherein the destination local node is located between the local node adding traffic and the hub node on the optical ring.

4. The optical network of claim 1, wherein each local node is operable to transmit a request message to the hub node on an optical supervisory channel and to receive a grant message from the hub node on the optical supervisory channel.

5. The optical network of claim 1, wherein the request message identifies a destination node associated with the traffic to be transmitted by the local node transmitting the request message; and wherein the hub node is further operable to transmit an intimation message to the destination node on an optical supervisory channel.

6. The optical network of claim 1, wherein each local node is operable to determine whether any other local node is transmitting on the transmitting wavelength by:
   determining at a first time whether any other local node is transmitting on the transmitting wavelength;
   in response to determining that another local node is transmitting on the transmitting wavelength, waiting a predetermined period of time; and
   determining at a second time whether any other local node is transmitting on the transmitting wavelength.

7. The optical network of claim 1, wherein the hub node is further operable to:
   determine whether a local node has finished transmitting traffic at the transmitting wavelength; and
   in response to determining that a local node has not finished transmitting traffic, transmit a refresh message to the plurality of local nodes on an optical supervisory channel indicating that the local node has not finished transmitting traffic.

8. The optical network of claim 7, wherein each local node is operable to determine whether any other local node is transmitting on the transmitting wavelength by determining whether the local node has received a refresh message within a predetermined period of time.

9. The optical network of claim 7, wherein the hub node is further operable to transmit refresh messages to the local nodes at predetermined time intervals.

10. An optical network, comprising;
    an optical ring;
    a plurality of local nodes coupled to the optical ring and operable to add traffic to and drop traffic from the optical ring, each of the local nodes operable to add traffic to the optical ring by:
       transmitting a request message to a hub node coupled to the optical ring, the request message requesting use of the transmitting wavelength; and
       in response to receiving a grant message from the hub node, transmitting traffic on the transmitting wavelength; and
    the hub node coupled to the optical ring and operable to:
       receive traffic over the optical ring from the plurality of local nodes on a transmitting wavelength;
       transmit traffic over the optical ring to the local nodes on a receiving wavelength;
       receive a request message from a local node;
       in response to receiving the request message, decide whether to grant the requesting local node use of the transmitting wavelength based on a priority status associated with the requesting local node and a priority status associated with a local node currently transmitting traffic on the transmitting wavelength; and
       in response to deciding to grant the requesting local node use of the transmitting wavelength, transmitting an interruption message to the local node currently transmitting traffic at the transmitting wavelength and a grant message to the requesting local node.

11. The optical network of claim 10, wherein the local node currently transmitting traffic on the transmitting wavelength is operable to terminate transmission in response to receiving the interruption message, and wherein the requesting local node is operable to begin transmitting on the transmitting wavelength in response to receiving the grant message.

12. The optical network of claim 10, wherein the hub node is further operable to, in response to deciding not to grant local node use of the transmitting wavelength, transmitting a negation message to the local node.

13. The optical network of claim 12, wherein a node, in response to receiving a negation message, is operable to:
   wait a predetermined period of time;
   modify the priority level associated with the local node in response to waiting the predetermined period of time; and
   transmit a second request message to the hub node.

14. The optical network of claim 10, wherein the hub node is operable to transmit the interruption message and the grant message on an optical supervisory channel.

15. The optical network of claim 10, wherein the hub node is operable to:
   determine whether a local node has finished transmitting traffic on the transmitting wavelength; and
   in response to determining that the local node has not finished transmitting traffic on the receiving wavelength, transmit a refresh message to the plurality of local nodes on an optical supervisory channel indicating that the local node has not finished transmitting traffic.

16. The optical network of claim 10, wherein the request message identifies a destination node associated with the traffic to be transmitted by the local node transmitting the request message and wherein the hub node is further operable to transmit an intimation message to the destination node on a supervisory channel.

17. A method for communicating on an optical network, comprising:
   determining, at a source local node, whether any other local node is transmitting on an optical ring at a transmitting wavelength;
   in response to determining that no other local node is transmitting at the transmitting wavelength, transmitting a request message to a hub node, the request message requesting use of the transmitting wavelength;
   receiving a grant message from the hub node; and
   in response to receiving the grant message from the hub node, transmitting traffic at the transmitting wavelength.

18. The method of claim 17, wherein transmitting traffic at the transmitting wavelength comprises:
   transmitting traffic, at the transmitting wavelength, from the source local node to the hub node, and
   transmitting traffic, at a receiving wavelength, from the hub node to a destination local node of the traffic.

19. The method of claim 17, wherein transmitting traffic at the transmitting wavelength comprises transmitting traffic, at the transmitting wavelength, from the source local node to a destination local node of the traffic located between the source local node and the hub node on the optical ring.

20. The method of claim 17, wherein transmit the request message to the hub node comprises transmitting the request message to the hub node on an optical supervisory channel and receiving the grant message comprises receiving the grant message from the hub node on the optical supervisory channel.

21. The method of claim 17, wherein transmitting the request message comprises transmitting a request message that identifies a destination node of the traffic to be transmitted by the source local node, and further comprising transmitting an intimation message from a hub node to the destination node on an optical supervisory channel.

22. The method of claim 17, wherein determining whether any other local node is transmitting on the transmitting wavelength comprises:
   determining at a first time whether any other local node is transmitting on the transmitting wavelength;
   in response to determining that another local node is transmitting on the transmitting wavelength, waiting a predetermined period of time; and
   determining at a second time whether any other local node is transmitting on the transmitting wavelength.

23. The method of claim 17, further comprising:
   determining, at a hub node, whether a local node has finished transmitting traffic on the transmitting wavelength; and
   in response to determining that the transmitting local node has not finished transmitting traffic, transmitting a refresh message from the hub node to a plurality of local nodes on an optical supervisory channel indicating that the transmitting local node has not finished transmitting traffic.

24. The method of claim 23, wherein determining whether any other local node is transmitting comprises determining whether the source local node has received a refresh message within a predetermined period of time.

25. The method of claim 23, transmitting idle messages from the hub node to a plurality of local nodes at predetermined time intervals.

26. A method for communicating on an optical network, comprising:
   transmitting, from a source local node, a request message to a hub node coupled to an optical ring, wherein the hub node is operable to receive traffic on the optical ring at a transmitting wavelength and to transmit traffic to a plurality of local nodes at a receiving wavelength, and wherein the request message requests use of a transmitting wavelength by the source local node; and
   in response to receiving the request message at the hub node, deciding whether to grant the source local node use of the transmitting wavelength based on a priority status associated with the source local node and a priority status associated with a local node currently transmitting traffic on the optical ring at the transmitting wavelength;
   in response to deciding to grant the requesting local node use of the transmitting wavelength, transmitting an interruption message from the hub node to the local node currently transmitting traffic and a grant message to the requesting local node; and
   in response to receiving a grant message from the hub node, transmitting traffic from the source local node to a destination local node on the transmitting wavelength.

27. The method of claim 26, further comprising terminating transmission on the transmitting wavelength by the currently transmitting node in response to the currently transmitting node receiving the interruption message, and initiating transmission on the transmitting wavelength by the source local node in response to the source local node receiving the grant message.

28. The method of claim 26, further comprising transmitting a negation message from the hub node to the source local node, in response to deciding not to grant the source local node use of the transmitting wavelength.

29. The method of claim 26, further comprising:
   waiting a predetermined period of time, in response to the source local node receiving the negation message;
   modifying the priority level associated with the source local node in response to waiting the predetermined period of time; and
   transmitting a second request message from the source local node to the hub node.

30. The method of claim 26, wherein transmitting the interruption message comprises transmitting the interruption message to the currently transmitting local node on an optical supervisory channel, and wherein transmitting the grant message comprises transmitting the grant message to the source local node on the optical supervisory channel.

31. The method of claim 26, further comprising:
  determining whether a local node has finished transmitting traffic on the transmitting wavelength; and
  in response to determining that the local node has not finished transmitting traffic on the transmitting wavelength, transmitting a refresh message to a plurality of local nodes on an optical supervisory channel indicating that the local node has not finished transmitting traffic.

32. The method of claim 26, wherein transmitting the request message comprises transmitting a request message that identifies a destination local node associated with traffic to be transmitted by the source local node, and further comprising transmitting an intimation message to the destination local node on an optical supervisory channel.

* * * * *